(12) United States Patent
Kovács et al.

(10) Patent No.: US 12,471,878 B2
(45) Date of Patent: Nov. 18, 2025

(54) METHOD AND SYSTEM FOR PROCESSING A PHONOCARDIOGRAPHIC SIGNAL CHARACTERIZING FETAL BREATHING MOVEMENT

(71) Applicant: Pázmány Péter Katolikus Egyetem, Budapest (HU)

(72) Inventors: Ferenc Kovács, Budapest (HU); Márton Áron Goda, Budapest (HU)

(73) Assignee: Pázmány Péter Katolikus Egyetem, Budapest (HU)

( * ) Notice: Subject to any disclaimer, the term of this patent is extended or adjusted under 35 U.S.C. 154(b) by 449 days.

(21) Appl. No.: 17/793,560

(22) PCT Filed: Jan. 20, 2021

(86) PCT No.: PCT/HU2021/050004
§ 371 (c)(1),
(2) Date: Jul. 18, 2022

(87) PCT Pub. No.: WO2021/148828
PCT Pub. Date: Jul. 29, 2021

(65) Prior Publication Data
US 2023/0058426 A1     Feb. 23, 2023

(30) Foreign Application Priority Data
Jan. 23, 2020   (HU) .................................. P2000024

(51) Int. Cl.
*A61B 8/02*     (2006.01)
*A61B 5/344*    (2021.01)

(52) U.S. Cl.
CPC ................ *A61B 8/02* (2013.01); *A61B 5/344* (2021.01)

(58) Field of Classification Search
CPC ........ A61B 8/02; A61B 5/344; A61B 5/02411; A61B 5/4362; A61B 8/0866;
(Continued)

(56) References Cited

U.S. PATENT DOCUMENTS

| 2009/0182240 A1* | 7/2009 | Jang | A61B 5/0245 |
| | | | 600/504 |
| 2010/0198082 A1* | 8/2010 | Park | A61B 5/366 |
| | | | 600/483 |

FOREIGN PATENT DOCUMENTS

WO   2020004721   2/2020

OTHER PUBLICATIONS

European Patent Office, International Search Report in PCT Application No. PCT/HU2021/050004, Jan. 20, 2021 (4 pgs.) and Written Opinion Of The international Searching Authority (6 pgs.) Jun. 29, 2022.

(Continued)

*Primary Examiner* — Benjamin J Klein
*Assistant Examiner* — Daniel Tehrani
(74) *Attorney, Agent, or Firm* — Wood Herron & Evans LLP

(57) ABSTRACT

The invention is a method for processing a phonocardiographic signal characterising fetal breathing movement (FBM), wherein
in initial start point (SP) determination (S100)
in frequency filtering (S110), bandpass-filtered signals of frequency subbands by first and second bandpass filters are generated from the phonocardiographic signal, and
first identified SP of an FBM episode is determined in a frequency subband in SP search (S120),
in episode discovering (S130) further SP is searched applying the SP search (S120) in episode search time period, and (Continued)

if found at smaller distance from identified SP than a clustering threshold, it is merged with identified SP, if found at larger distance from identified SP than the clustering threshold, an SP closest to identified SP is identified as second identified SP.

The invention is, furthermore, a system for processing a phonocardiographic signal characterising FBM. (FIG. 4A)

15 Claims, 8 Drawing Sheets

(58) Field of Classification Search
CPC ....... A61B 5/4343; A61B 5/0011; A61B 5/28; A61B 2018/00839; A61B 5/318
See application file for complete search history.

(56) References Cited

OTHER PUBLICATIONS

Kovacs F et al, "A Proposed Phonography-Based Measurement of Fetal Breathing Movement Using Segmented Structures with Ffrequency Splitting," 2020 42nd Annual International Conference of the IEEE Engineering In Medicine & Biology Society (EMBC), IEEE, Jul. 20, 2020, pp. 4483-4486, XP033815528.

Lindstrom K et al, "Device for measurement of fetal breathing movements-I recording the distance between two echogenerating structures as a function of time," Ultrasound In Medicine and Biology, New York, NY, vol. 3 No. 2-3, Jun. 7, 1977, pp. 143-151, XP026416055.

Jaros Rene et al, "Fetal phonocardiography signal processing from abdominal records by non-adaptive methods," Proceedings of Spie: ISSN 0277-786X, vol. 8615, 20th St Bellingham WA 98225-6705, vol. 10808, Oct. 1, 2018.

Bassil H E et al, "Real time processing and analysis of fetal phonocardiographic signals," Clinical Physics and Physiological Measurement, Institute of Physics Publishing, Bristol, GB, vol. 10, No. 4B, vol. 10, No. 48, Nov. 1, 1989, pp. 67-74.

Shinozuka N et al, "Measurement of Fetal Movements Using Multichannel Ultrasocund Pulseddoppler: Autorecgonition of Fetal Movements By Maximum Entropy Method," Medical And Biological Engineering And Computing, Springer, Heildelberg, DE, vol. 31, Jul. 1, 1993, pp. S59-S66.

* cited by examiner

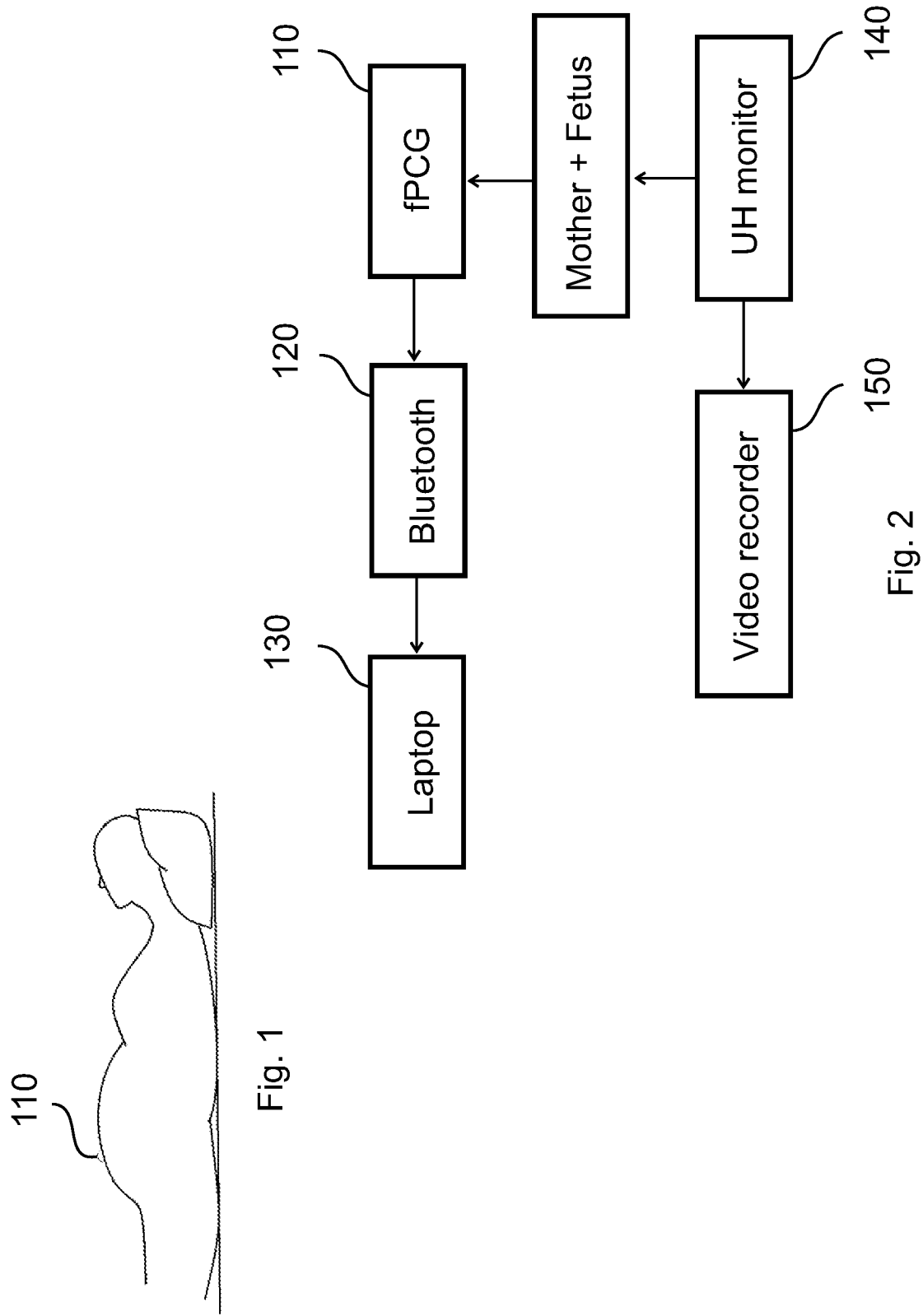

METHOD AND SYSTEM FOR PROCESSING A PHONOCARDIOGRAPHIC SIGNAL CHARACTERIZING FETAL BREATHING MOVEMENT

This application claims priority, under Section 371, and/or as a continuation under Section 120, to PCT Application No. PCT/HU2021/050004, filed Jan. 20, 2021, which claims priority to Hungarian Application No. P2000024, filed Jan. 23, 2020.

TECHNICAL FIELD

The invention relates to a method and a system adapted for processing a phonocardiographic signal characterising fetal breathing movement.

BACKGROUND ART

Initially, fetal breathing was measured applying simple mechanical motion sensor devices that, when placed on the maternal abdominal wall, were able to track the forward and backward-direction movement thereof. The information thereby obtained is rather poor but still indicates the presence of movement periods, and, if such movements are periodical in nature, then they most probably are not general movements (of the trunk or limbs) but are related to breathing. In such a way, it was possible to record this, although little information was then known about their role and significance.

The first important source of information on fetal breathing is a study by J. Patrick, R. Natale, B. Richardson, "Patterns of human fetal breathing activity at 34 to 35 week's gestational age", Amer. *J. Obstet. Gynecol.*, vol. 132 (1978), pp. 507-513, wherein the rate and duration of such movements were determined for the first time, while it was also possible to distinguish the movements from other movement types of the fetus, such as rotation of the trunk and the movements of the head and limbs. The study published by H. D. Junge, H. Walter, "Behavioral states and breathing activity in the fetus near term," *J. Perinatal Med.*, Vol. 8. (1980) pp. 150-157, investigating the relationship between the breathing movement and the sleeping state, went a step further, also measuring the fetal heart rate. The study by Y. Noguchi et al, "Breathing modulates fetal heart rate", *IEEE Northeast Biol. Conf.* 1989, pp. 233-234 dealt with the same issues, searching for a relationship between the two processes mentioned above; however, their results were not completely proven by further study. The development of ultrasonic measurement technology opened up possibilities for performing much more accurate investigations than were hitherto possible, which was published in this topic by J Andrews et al. in "The variability of fetal breathing movements in normal human fetuses at term", *Am. J. of Obst. Gynecol.*, Vol. 11, No. 2, pp. 280-282, determining the dimensions and the variability of such movements with millimetre accuracy.

As a result of these early studies, although the underlying factors governing them had not yet been clarified, fetal breathing movements became a major indicator of the fetal health status. This is also indicated by the fact that the number and duration of the fetal breathing movements slowly became part of the so-called biophysical profile of the fetus, which necessitated the regular measurement of this afterwards. However, the implementation of such regular measurements was made difficult by the random nature of the onset of breathing motions, which of course necessitated considerably longer investigation durations. Independent solutions for this problem were offered by C. S. Berger, P. Trigg in "The Measurement of Fetal Movement Using a Strain-Gauge Transducer," *IEEE Trans. on Biomed. Eng.* vol. 28, No. 11, pp. 788-790, by D. G. Talberg, et al in "Wide Bandwidth Fetal Phonography Using a Sensor Matched to the Compliance of the Mother's Abdominal Wall," *IEEE Trans. on Biomed. Eng.* vol. 33, No. 2, pp. 175-181, and M. N. Ansourian, et al in "Autoregressive Spectral Estimation of Fetal Breathing Movement," *IEEE Trans. Biomed. Eng.*, Vol. 36. No. 11, pp. 1076-1084, by applying a sensor based on the piezoelectric principle for measuring the mechanical signal of the movement on the maternal abdomen. A different approach was taken by H. G. Goovaerts et al. in "A Transducer for Detection of Fetal Breathing Movements," *IEEE Trans. Biomed. Eng.*, Vol. 36, No. 4 pp. 471-478, and M. N. Ansourian, et al in "Autoregressive Spectral Estimation of Fetal Breathing Movement," *IEEE Trans. Biomed. Eng.*, Vol. 36. No. 11, pp. 1076-1084, who measured electric current generated in a coil formed on a flexible membrane, while it was moving in the field of a magnet disposed in a sensor placed on the abdomen of the mother. Both sensor types were considered revolutionary new at the time; however, as it turned out later, even with further enhancements they only presented a crude view of the movements, not getting any closer to the finer details, such as the accurate temporal function of the movements and the intermittent stops. A problem was that the sometimes very lengthy measurements were uncomfortable for the mother.

In spite of that, fetal movements became the subject of a wide range of research; among others, their relationship with fetal heart activity was again brought to the table, in relation to which the works of A. Moczko et al.: Detection of Fetal breathing Movements with Joint Time-Frequency Analysis of Cardiotocogram Records, *IEEE $20^{th}$ Int. Conf.* Vol. 20, No. 3. (1998), pp. 1501-1504. and Foulquiere Using Modified Fetal Monitor and Signal Processing in Detecting Fetal Breathing Movement, *IEEE Symposium for Ultrasonics*, 2000, pp. 1391-1394. have to be mentioned. The same topics were addressed in J. Florido, et al.: Analysis of fetal breathing movements at 30-38 weeks of gestation, *J. Perinat. Med.*, 33 (1): 38-41 2005, but already making use of ultrasonic measurement technology.

Research into fetal breathing was apparently thrust forward with the becoming widespread of very advanced signal processing methods, including a wide range of frequency and spectral processing algorithms, the research efforts being primarily targeted at diagnosing disorders already appearing in the fetal ages. The research group of M. N. Ansourian had a significant role in the field (A transducer for detecting foetal breathing movements using PVDF film, *Phys. Meas.*), as well as the group studying the causes of intrauterine wasting led by J. C. Dornain, the author of the study "The rate and regularity of breathing movements in the normal and growth-retarded fetus", *Int. J. of Obstet. and Gynaecol.*, 91/1. Finally, a related study by A. J. Cousin, et al.: Tracking System for Pulsed Ultrasound Images: Application in Quantification of Fetal Breathing Movements, *IEEE Trans. Biomed. Eng.*, Vol. 30, No. 79 pp. 577-584 has to be mentioned, together with the research of M. Akay: Analyzing Fetal Breathing Rates Using Matching Pursuits. *IEEE Trans. Biomed. Eng.*, March/April 1995, pp. 195-198 which, utilizing the Matching Pursuit (MP) method, opened a new perspective in processing biological signals. These included the application of the fuzzy method (B. H. Kumar: A fuzzy expert system design for analysis of body sounds and design of a unique electronic stethoscope, *Biosensors and Bioelectronics*, 22 (2007), pp. 1121-1125).

In relation to fetal movements, the issue of fetal hiccups was also raised relatively early (E. E. van Woerden et al: Fetal hiccups: characteristics and relation to fetal heart rate, *Eur. J. Obstet. Gynecol. Reprod. Biol.* 1989, 30 (3): pp. 209-216), as well as its relationship with fetal breathing movements (M. Pillai, D. James: Hiccups and breathing in human fetuses, *Archive of Disease in Childhood*, 1990, 65: pp. 1072-1075, and F. Witter, et al: the relationship between hiccups and heart rate in the fetus, *J. Maternal-Fetal Neonatal Med.*, 2007, 2 (4), pp. 289-292), and the differentiation between two movement types. Finally, a completely new issue is the potential relationship between fetal breathing and sudden infant death (P. Zemb, et al.: Prenatal observation of heart rate sequences presenting entropic analogies with Sudden Infant Death Syndrome: preliminary report, *IEEE CBMS* 2013, pp. 421-424).

In the following, the state of the art of acoustical fetal breathing movement investigation is described. In relation to investigation of fetal heart activity, the idea had emerged that fetal breathing-which was measured then only rudimentary—can be connected to heart activity, more particularly the temporal changes, i.e., the variability thereof. Mainly due to measurement inaccuracies, it was not possible to decisively prove this, and, although some degree of relationship may exist, no tangible results (i.e., results applicable for medical investigation) related to that have been published to date. Related early research on measuring fetal heart activity includes the publication by F. Kovacs et al.: Fetal Breathing Transmission in Phonocardiographic Monitoring Telemedicine Systems, *Proc. IEEE 28th Ann. Int. Conf*, 2006, New York, August30. pp. 5226-5229, in which an attempt is made at providing an interpretation of the movements applying the then-new acoustic (phonocardiographic) method, but the results obtained by the measurements included in the study were rather uncertain, so research in this direction was stopped. The main reason for that was that the mechanical measurement technologies available at the time could only provide a crude view of how the movements were started and of their approximate frequency, which was insufficient for more thorough study.

Improvements in acoustics applied for fetal investigation have provided another option for measuring fetal movement (Fetal Breathing Movement, FBM), namely by recording the higher-frequency sounds generated by the movements, which, due to the higher frequency band can usually be measured more easily, and can also be more easily related to other acoustic measurements (e.g., in relation of fetal heart activity; F. Kovács, et al.: Phonocardiography—past and future possibilities, *Comp. Methods and Prog. Biomed.*, vol. 104, no. 1. (October 2011) pp. 19-25).

Another advantage is that in addition to pure identification of movement, the improved-accuracy measurements allow for discovering further relationships. These may include the very reliable exclusion of other movement types, e.g., rhythmic movements of limbs, and potential interrelations with certain parameters of fetal heart activity.

In their study *A Successive Cancellation Algorithm for Fetal Heart-Rate Estimation Using an Intrauterine ECG Signal* IEEE Trans. Biomed. Eng. 49 (9), pp. 943-954 (2002) K.-C. Lai and J. J. Shynk made an attempt for distinguishing fetal ECG signals from maternal signals of much higher intensity applying a so-called cost-factor, but their method has not proven reliable enough.

In US 2010/0137727 A1 a system comprising a multitude of ECG (electrocardiogramand MCG (magnetocardiography) sensors is applied making use of the interference of the signals. The technical approaches disclosed in U.S. Pat. Nos. 7,869,863 and 7,435,224 also apply a multitude of electrodes that determine the lie of the fetus applying vector evaluation of the measured signals. An ECG method applicable for measuring fetal heart rate at home is disclosed in U.S. Pat. No. 7,532,923. Although these approaches brought about significant improvements in the field of difficult-to-measure fetal parameters, they were not capable of giving any information on the movements of the fetus.

In U.S. Pat. No. 6,254,537 a monitoring system is disclosed wherein more detailed information on the status of the fetus is provided by mathematical analysis of the complex biophysical profile, which is relevant since, in theory, the fetal movement had been included in the investigations performed on the fetus, but due to measurement-related problems they were ignored. In U.S. Pat. No. 6,522,916, a telemetry system is applied for evaluation. In U.S. Pat. Nos. 6,350,237 and 6,610,010 a similar path is followed: they attempt to provide more comprehensive results within the limits of ultrasonic investigation by widening the applied mathematical apparatus.

In U.S. Pat. No. 5,596,993 and in the related U.S. Pat. No. 5,957,855, a certain type of processing signals representing fetal breathing is provided.

Although US 2008/0154155 A1 and the U.S. Pat. No. 8,764,686 B2 originating from the same Japanese research group are directed at discovering fetal movements, the measurement method applied therein is based on a very dated, nearly two decades-old process, and is therefore applies the technology available at the time.

Fetal breathing is also addressed in US 2009/0036787 A1 and US 2012/0232418 A1. US 2006/0056641 A1 relates to the processing of physiological signals.

In view of the known approaches, there is a demand for a method and a system adapted for processing a phonocardiographic signal characterising fetal breathing movement that can process the breathing movements corresponding to the fetal biophysical profile more effectively compared to known technical approaches.

DESCRIPTION OF THE INVENTION

The primary object of the invention is to provide a method and system which is free of the disadvantages of prior art approaches to the greatest possible extent.

The objects of the invention can be achieved by the method according to claim 1 and the system according to claim 14. Preferred embodiments of the invention are defined in the dependent claims.

The object of the invention is to provide a method and a system adapted for processing a phonocardiographic signal characterising fetal breathing movement that can process the breathing movements corresponding to the fetal biophysical profile more effectively compared to known technical approaches.

Thanks to the more effective processing of the fetal breathing movements, in addition to checking the protocol given in the fetal biophysical profile, the method and system according to the invention preferably also allows the much more thorough evaluation of fetal breathing movements.

By fulfilling the above described objects, utilizing the method and system according to the invention it becomes possible to provide complex fetal monitoring, foregrounding the detection of the fetal breathing movement.

Furthermore, the method and system according to the invention preferably enables the (near) real-time processing of phonocardiographic signals.

BRIEF DESCRIPTION OF THE DRAWINGS

Preferred embodiments of the invention are described below by way of example with reference to the following drawings, where FIG. 1 is a schematic drawing illustrating an assembly for measuring the fetal breathing, FIG. 2 is a block diagram illustrating a measurement arrangement completed with ultrasonic investigation.

MODES FOR CARRYING OUT THE INVENTION

Figure 3:
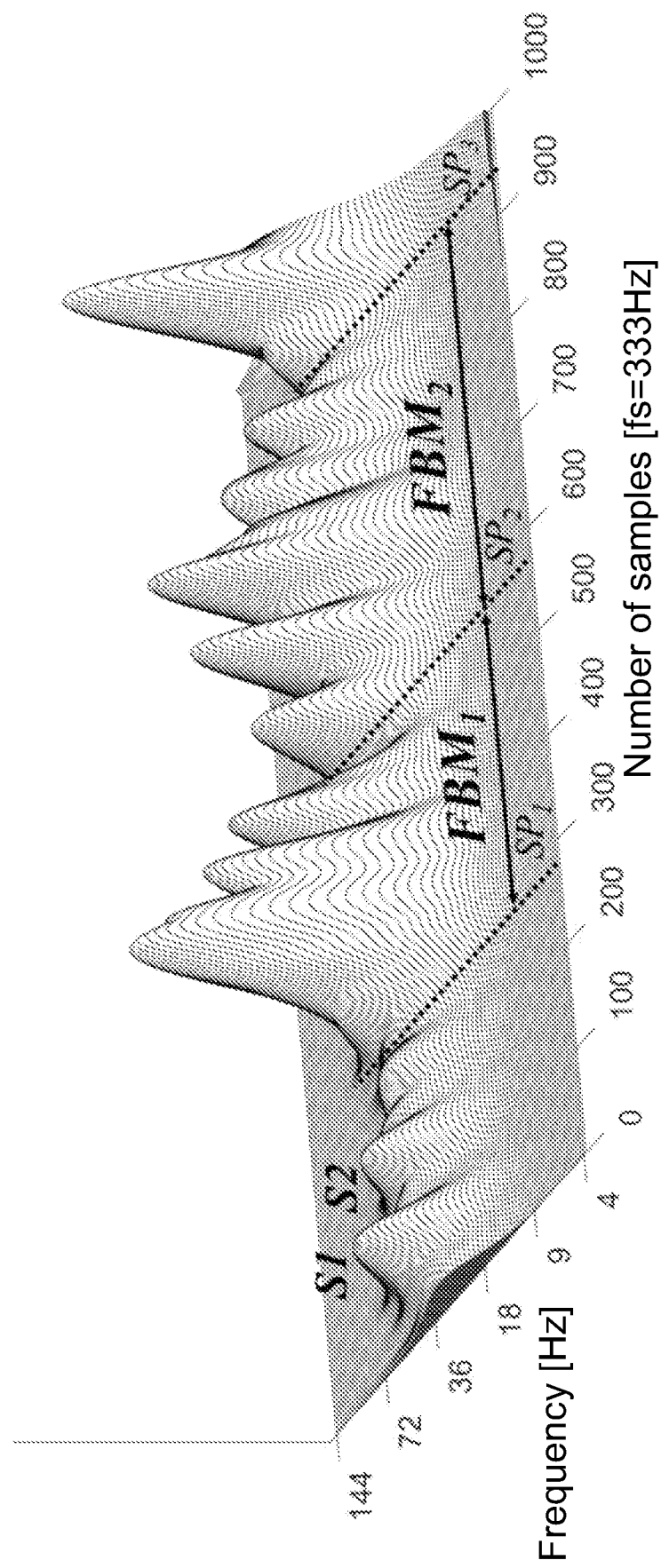
FIG. 3 illustrates the locations of the minima and maxima of identified fetal breathing movements in phono-acoustic signal, as a function of time and frequency.

According to the invention, the acoustic signals of FBM are preferably measured by means of acoustic sensors (phonocardiographic sensors) placed on the abdomen of the pregnant woman. This methodology is also applied for measuring fetal heart sounds, for example by the help of a CTG (cardiotocograph) device that can also be applied for monitoring at home. If the sensor in question forms a part of a conventional device optimized for investigating fetal heart activity, then in the case of being applied for discovering fetal movements it has to be adapted to them, or more accurately to the transfer frequency thereof. Because the frequency band of the former is typically 18-75 Hz, the harmonics of the fetal movements have a repetition time around 1 second cannot be detected here. Consequently, the measurement is targeted at detecting the components of the higher-frequency signals generated by the movements that fall into this band, i.e., essentially these are the subject of the investigation.

A measurement assembly preferably applicable with the invention is shown in FIG. 1. During measurement, a lightweight plastic sensor with a diameter of approx. 8 cm (phonocardiographic (acoustic) sensor 110) is arranged on the abdomen of the lying or reclining pregnant woman, the sensor is pressed on the mother's abdomen at the point nearest to the fetus by a belt. This point can be found by recognising fetal heart sounds, which does not pose any problem to mothers.

The signal is preferably pre-processed as follows: The sensor signal is amplified utilizing a low-noise preamplifier and is fed via a few metres of cable and a preprocessing unit to the network (Internet, mobile phone network). The audible sounds produced by upmixing by the preprocessing unit can also help the mother in positioning the measuring head. The preprocessing unit is also adapted to decide, based on the received signal, if the signal is generated by movement, it is a cardiac activity signal, or is an unimportant signal (maternal heart sounds, other maternal movements, hiccup, etc.).

The amplitudes of the detected signals depend on the position of the fetus, so especially in the case of longer-duration measurements the position of the sensor has to be corrected from time to time; however, in a given range no correction is needed for the sensor due to the operation of automatic control (AGC—automatic gain control, a known process control principle) approach.

The episodes identified by means of acoustic measurements can be verified (for example in questionable cases) by a synchronised measurement applying a high-resolution ultrasonic sonographic apparatus (see FIG. 2). In such a case, the arrangement according to FIG. 1 is completed with the sonographic scanning of the mother's abdomen. In FIG. 2, the letters fPCG (fetal phonocardiograph) are shown in the box symbolising the phonocardiographic sensor 110, indicating the purpose of the phonocardiographic sensor 110. The phonocardiographic sensor 110 is preferably connected to a computer, e.g. a laptop 130 (basically performing evaluation-related tasks) through a bluetooth connection 120 (i.e. wireless connection). In FIG. 2, sonographic scanning is represented by an ultrasonic monitor 140; like the phonocardiographic sensor 110, the ultrasonic monitor also receives data through an ultrasonic measuring head placed on the mother's abdomen. The ultrasonic monitor 140 is preferably connected to a video recorder 150 adapted for recording the signals.

The direct data transfer referred to above, e.g. through bluetooth and a mobile network, in an extremely preferable manner allows (near) real-time evaluation. The method and system according to the invention can therefore be utilized in a (near) real-time manner, applying a so-called online processing (in relation to this, see also below the description of waiting on certain data). The invention can be equally applied for post-processing the phonocardiographic signal, applying a so-called offline processing.

In course of scanning performed by the arrangement according to FIG. 2 a mark is placed manually on a channel parallel to the acoustic measurement at the time instant corresponding to each movement (selecting an easily observable point thereof). On the video recordings, the exact time of the movements can also be determined applying a photogrammetry method. Our experiments indicated that the movements marked in the video recording are in perfect alignment with the signal of the synchronizing channel.

In the case of—otherwise particularly preferably-measuring fetal movements and fetal cardiac activity utilizing the same measurement head the issue of high intensity differences arises. To address that, preferably a (so-called "smart") preprocessing unit is required, which set the amplification at the optimum value by recognising the measured signal. In our experience, the movement signal has an intensity being 2-3 times the intensity of heart sounds, so in case of movements occurring during cardiac activity investigation they can easily be differentiated.

The characteristic features of the acoustic signal to be measured are set forth in the following. A complex signal corresponds to fetal breathing movement which consists of recurring forward-backward motions (hereinafter called "episodes") that can be considered quasi-periodic; a sequence of episodes is hereinafter also called an "epoch".

The chaotic nature of the signal manifests itself in the case of the episodes, which makes processing more difficult (see in more detail below). As it was clearly indicated already by early measurements in the field-taking into account the Lyapunov criteria related to chaotic behaviour, and also the so-called EMD (Empirical Mode Decomposition) or IMF (Intrinsic Mode Functions) methods, which are decomposition methods similar to wavelet analysis that yield time-variable frequency components-, the movements in question are typical chaotic movements, which implies that customary signal processing methods either cannot be applied, or can be applied only to a limited extent.

Processing is made even more difficult by various interfering signals superposed to the signal, such as the fetal heart sound, the sounds of the mother's cardiovascular and digestive systems, and external noises. Due to the overlaps between the bands, these can only be partially removed by simple frequency filtering. Evaluation is made more difficult by the fact that the repetition time of fetal breathing (0.8-1.2 s) essentially corresponds to the mother's heart rate of 80-100 bpm. As another interfering factor, fetal hiccups have to be mentioned. Although hiccups can also be very important from a medical aspect, the signal portions corresponding to the hiccups can be easily differentiated from the breathing movements due to their shape.

There is a clearly detectable periodicity (see in FIG. 3 the heaps corresponding to the fetal breathing movements (FBMs)) in the time diagram of the signals generated during the forward-direction breathing movement of the fetus (which is the portion of the process that can be considered the most deterministic) that—as statistical data—can be applied as an indicator of the start of the movement. Before the starts of the episodes, i.e., during the intermittent (short) tranquil states of the fetus, there are in principle no acoustic signals. That is, these intervals have nearly zero signal level, which can be easily observed among the components of the decomposed frequency band in spite of the very short duration of the intervals.

Thereby the most important data value of the episode becomes the dominant one, because utilizing the average duration of the episodes ($t_e$=0.8-1.2 s) an estimate can already be given for the actual episode duration.

As can be seen based on FIG. 3, the starting frequency of the fetal breathing movement (FBM) and of the heart sounds can be clearly differentiated (the FBM signal occurs at lower frequencies, as it is shown in FIG. 3 at a logarithmic frequency scale; FIG. 3 is a smoothed diagram but, like FIG. 5, characterizes the amplitudes showing the intensity maxima), in the 20-30 Hz frequency band the FBM can be clearly detected, while the peak values of the heart sounds are located at higher frequencies. With the help of subsequent band pass filtering operations, this information can be extracted from the phono-acoustic signal.

From FIG. 3 the start event of the FBM caused by the contraction of the diaphragm—corresponding to a breath—that is reflected in a sudden increase of energy (a pronounced peak as a function of the time (sample number)) is clearly observable. After reaching the maximum signal level, the relaxation of the diaphragm can be observed simultaneously with the signal returning into the base state (peaks have decreasing intensity).

In FIG. 3 it can also be observed that, in contrast to the heart sounds, the duration of the FBM episodes is not equidistant, their duration being between 0.8-1.2 s. Minimum intensity locations marking potential start points of FBMs—in correspondence to the fall of intensity to its minimum value (which can be observed also in the figure illustrating the amplitude of the signals, as opposed to FIG. 3)—will hereinafter be called minimum zones (corresponding to decreased intensity values, essentially (around) the minima of the envelope of the absolute value of the signal). These minimum zones occur in different degree in the different frequency subbands (see below at the division of the baseband into frequency subbands)—i.e., their exact position may differ, but they are essentially at the same location (within certain threshold values); this position is clarified in course of clustering, see the relevant sections—but their discovering helps in the subsequent determination of FBMs.

In sum, therefore, the following can be discerned from FIG. 3:
1. The FBM signals can be clearly differentiated from the heart sounds, since the former start at lower frequencies (it is not the peaks that we investigate for but their start at lower frequencies, while in the case of heart sounds S1, S2 it is the peaks that are relevant);
2. the FBM signals rise steeper than the heart sounds;
3. their duration can be clearly discerned, although it is a lot more variable than the duration of heart sounds, it still falls into the test window (this has also been verified by ultrasonic measurements).

Under normal (generic experimental) circumstances, the signal level of FBMs is much higher than the signal level of environmental noises, and, by taking the signal level of the immediately preceding fetal heart sounds as a reference, the expected signal level of the movement can also be established, especially for the more deterministic forward-direction movements. In many cases, the episode also has another characteristic point: the so-called "return point" that divides the forward-direction movement from the backward-direction one. The time instant of this return point can also be found in a given interval, as it often takes a short state of rest. Often, this also results in a lower signal level, which increases the reliability of episode discovering.

The start of the forward-direction movement is indicated by a local minimum zone, namely an interval indicating the end of the previous episode; the end point of this interval is thus the start point (SP as indicated at many instances below) of the next episode.

These factors fundamentally affect the signal processing process because the characteristic features (movement features $J_m$, see below) that allow for reliably identifying the episodes of the signal have to be found based on them.

Figure 4A:
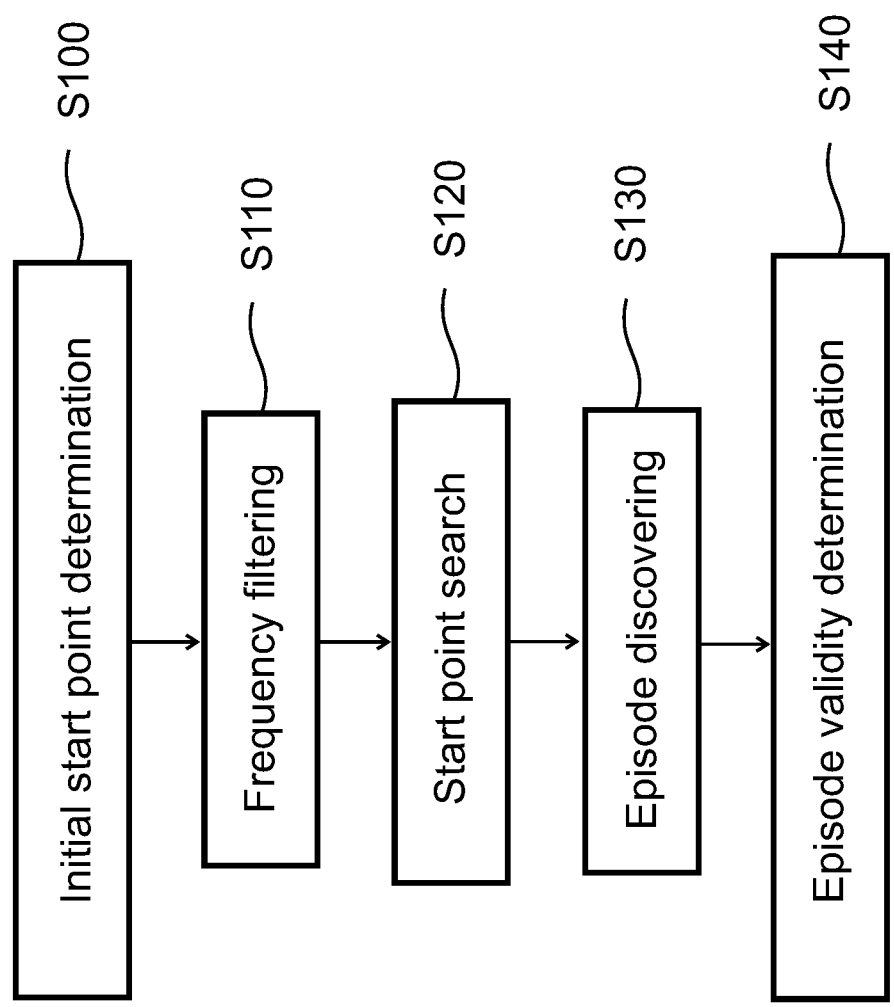
FIG. 4A is a flow chart illustrating the steps of the method according to the invention.

Based on the above, in course of the method according to the invention for processing (evaluating through processing, or evaluating) a (n acoustic) phonocardiographic (alternatively, phonocardiography) signal characterising fetal breathing movement
  in course of an initial start point determination step (operational step S100 in FIG. 4A)
    in a frequency filtering step (operational step S110 in FIG. 4A), respective second bandpass-filtered signals corresponding to frequency subbands having respective subband bandwidths are generated by means of a second bandpass filter from a first bandpass-filtered signal (a filtered-to-band signal, i.e. a band-filtered signal) obtained by filtering the phonocardiographic signal to a main investigation frequency band by means of a first bandpass filter (a filtering-to-band filter, that is a filter for filtering to a band, i.e. a band filter; as it will be shown, in a first step the signal is filtered to a wider band, then by means of a further bandpass filtering narrow subbands are generated therefrom), and a first identified start point corresponding to a fetal breathing movement episode is determined in a frequency subband corresponding to the first identified start point (this can be any subband; from now on it will be referred to using the previous term) in a start point search step (operational step S120 in FIG. 4A; the first start point can be found in any of the subbands, without finding the first start point the process could not be started; as it will be shown below, the same start point can occur in frequency subbands, in which case these occurrences are merged), in course of which, investigating presumed fetal breathing movement episodes in the second bandpass-filtered signals for each frequency subband (such episodes can be selected based on a predetermined initial value of the episode length or on earlier data, by selecting signal sections with a duration matching the episode length, and evaluating them for each frequency subband applying a sliding window or other methods), a start point of a fetal breathing movement episode is searched by comparing an acceptance sum obtained (composed) by weighting utilizing measured movement features (they can also be called "calculated movement features", or the adjective "movement" can be omitted; for preferred definitions see the formulas Jim below) obtained for the presumed fetal breathing movement episodes with respective acceptance threshold values (there are a number of options for performing the comparison, see below) corresponding to each of the frequency subbands.

A possible way of evaluating the presumed breathing movement episodes is described below where the measurement movement features and the acceptance sum are introduced, in that example it is also specified how the measured movement features can describe an episode (i.e., based on the portion encompassed by minimum zones, analysing the rise of the breathing movement, etc.).

The weighting mentioned in the operational step S120 is not a limitation, because the weights may be chosen to be 1 (unit value). As it is illustrated by an example below, certain measured movement features are added up applying weights, and the weighted reciprocal of a certain other parameter is added to the weighted sum. This is meant on that the acceptance sum is obtained (composed) utilizing these data.

In course of the method according to the invention, furthermore, in an episode discovering step (revealing step; operational step S130 in FIG. 4A), a further start point applying the start point search step is searched (if processing is performed in course of signal acquisition—i.e. in the case of online processing—the frequency filtering step is performed on the phonocardiographic signal before the start point finding step due to reading in the newer signal portions; this is not needed in case of post-processing—i.e. offline processing-, when it is sufficient to subject the signal to the frequency filtering step only once, expediently at the start of processing) in an episode search time period starting from the first identified start point (episode acceptance or acceptability duration), and if (in case) a start point is found in a frequency subband other than the subband corresponding to the first identified start point at a smaller distance from the first identified start point than a clustering threshold value, then it is merged (contracted) with the first identified start point, (the start points located closer than the clustering threshold are manifestations of the same start point in different frequency subbands, so they have to be merged together because an episode cannot occur between such start points), if a start point is found in any frequency subband (in a frequency subband) at a larger distance from the identified start point than the clustering threshold value, or (is found) in the frequency subband corresponding to the first identified start point at a smaller distance from the first identified start point than the clustering threshold value (that is, if such a start point is found that is already not another manifestation of the first identified start point, because it was either found in the same frequency subband as the first identified start point within the entire episode search time period, or it was found in another frequency subband further than the clustering threshold), then such a start point being closest to the first identified start point is identified as a second identified start point (that is, the first start point that is detected after the first identified start point—and is further therefrom than the clustering threshold-will be the second identified start point), and an episode validity determination step (operational step S140 in FIG. 4A) is performed for the first identified start point and the second identified start point (in this step the start points limiting (enclosing) the episode are always called the first and second identified start points; an exemplary embodiment of this step is detailed below), and after that continuing the method with the episode discovering step from the second identified start point (i.e. in that step another start point needed to be found after the second identified start point discovered herein) in case the processing of the phonocardiographic signal is continued (the method is continued until the processing is in progress, this can be until the investigation or the signal acquisition has ended/stopped, i.e. until the end of recording of the signal), if a start point is not found within the episode search time period, then continuing the method with a step adapted for determining (for identifying) another first identified start point (i.e. another (subsequent) such start point is searched that fulfils the role of the first identified start point; in the online case this is preceded, if necessary, by performing the frequency filtering step) in case the processing of the phonocardiographic signal is continued (this means that a start point has not been found in the allowed range (within the episode search time period), i.e., the breathing movement may have stopped, so another first identified start point must be found in order to continue the method according to the invention).

As it will be shown below, the episode validity determining step is preferably carried out applying episode groups, preferably also utilizing conditional (phantom) start points. However, this step can also be preferably carried out in other ways, even in simpler-presumably less efficient-ways. If conditional start points are not applied, then the episode encompassed by the first and second identified start points defined above can also be validated by checking whether its duration is between a lower and an upper limit (for example, between the lower and upper time period limit defined below); and if yes, then the episode is declared to be valid, while if it is outside the time duration determined this way (either shorter or longer than that), then the episode is declared to be invalid.

In the case of online processing, it is necessary to apply "prefetching" the signal for a certain extent-typically for the duration required for calculating the measured movement features—i.e., if a search is performed in the episode search time period, then, in order that the measured movement features can be calculated for the entire time interval, the prefetching has to extend over this time interval (the over-extension is approximately at least the average episode length; the interval-over which the measured movement feature with the longest sample period is calculated-extending forward from the currently investigated minimum zone). If the new start point is found earlier, then this time instant is not necessarily reached in the fetching. It is only important to "wait" for fetching the input data in the case of online processing (i.e., processing during the measurement), if the signal is processed offline, i.e. after the measurement has ended, then the signal data are available in the necessary time period. The search need not be performed where no data are available, because complete episodes cannot be located there; the phrasing "continuing the method in case the signal processing is continued" refers to this case; it can be checked whether the signal has the required length (i.e., the signal is available for the episode search time period and after for an average episode length) even before continuing the processing. If the measurement is stopped abruptly, it may happen that the search cannot be performed for the given episode search time period. This does not pose a problem, because in such a case simply no information is given on the last (i.e., the interrupted) episode.

The method preferably applies a subband bandwidth being in the range of 1-6 Hz, the main investigation frequency band preferably being 19-31 Hz.

As it will be shown below, the episode validity determining step can be carried out in a number of different ways; for example, by handling a given number of episodes (preferably, episode triplets) together, and allowing phantom—i.e., temporarily "questionable", conditional-start points. Thereby the method can be made more effective because unrecognised episode start points can also be "saved". However, it is not absolutely necessary to apply such multiple episodes; the episodes can also be counted directly based on their start points.

After the episode validity determining step, a step for reconstructing the complete signal may be applied, i.e., the valid episodes and the intervals necessarily occurring between them may be marked in the signal. However, it is not absolutely necessary to perform this evaluation step (not even in the embodiment illustrated in FIG. 4B; in that embodiment it is the last operational step S250).

Figure 4B:
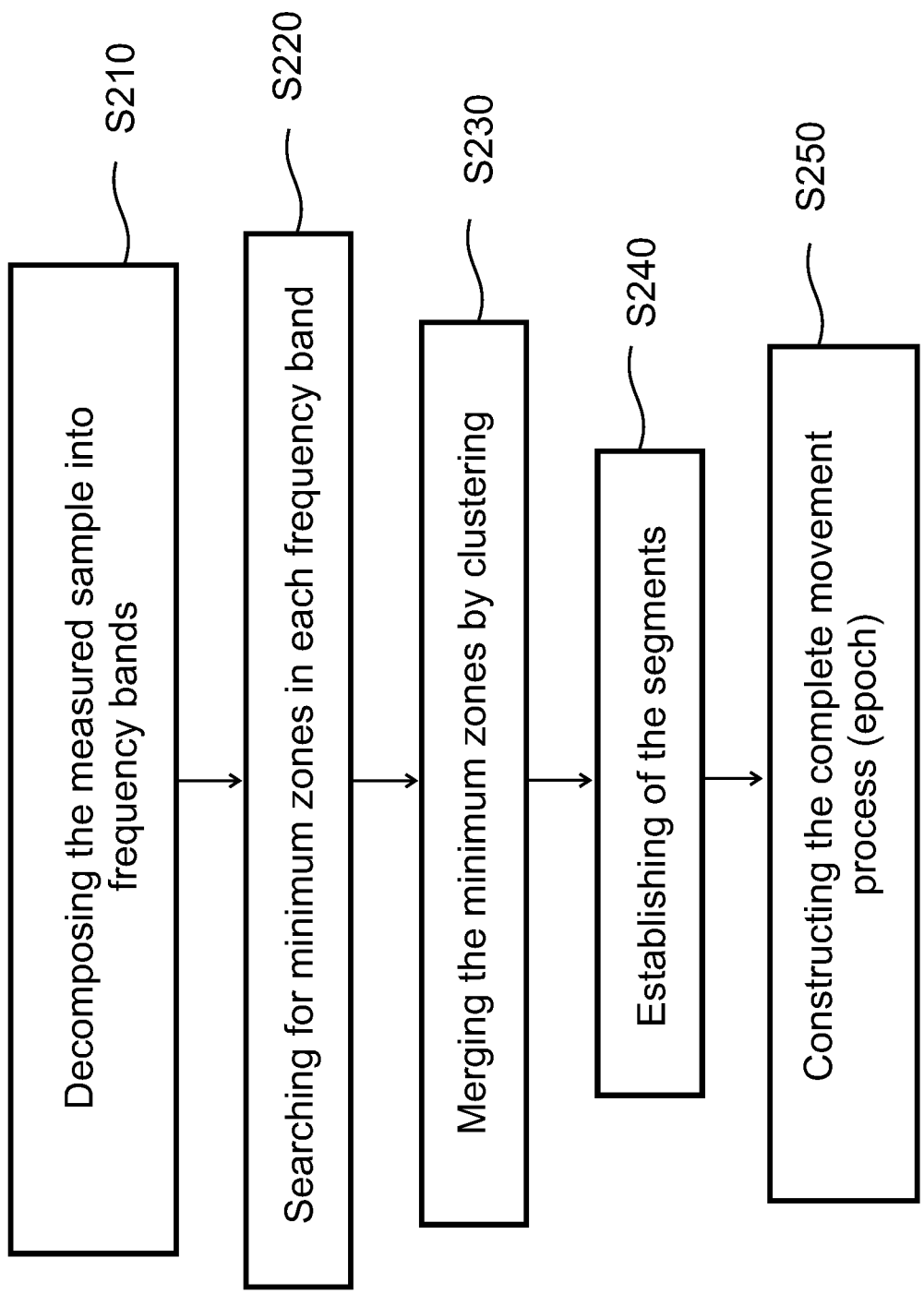
FIG. 4B illustrates, in an embodiment, the major components of the method according to the invention.

FIG. 4B illustrates the major steps of the method according to the invention introduced above applied for an embodiment (certain steps are given in more detail, and further steps are also included). The first step is the decomposing of the measured baseband signal sample—that is produced applying e.g. a 15th-order FIR (finite impulse response) bandpass filter operating at the band 19-31 Hz—into very narrow frequency bands (frequency subbands) having a bandwidth of for example 1-6 Hz (preferably 1-4 Hz, particularly preferably 2-4 Hz; operational step S210; the window width can be selected for example based on preliminary measurements). This step is advantageous because if the level of the residual signal in the minimum zones is investigated applying a low bandwidth signal (i.e., investigated on the low bandwidth signal itself), then the outlying frequency components are discarded, and only one component (or multiple but very close components) can appear in the short period in question (if they can be detected at all). Accordingly, after the first step, preferably as many as 12 digital signal instances are available that have a maximum resolution of 8 bits and are recorded at a sample time of 1 ms (but minimally 3 ms).

In our research many types of bandpass filters were tested such that the FBMs can be extracted from the phonoacoustic signal as effectively as possible. Of the tested filters, the IIR (infinite impulse response) bandpass filters have the advantage that they are capable of steeply cutting off the pass frequency range even at low orders, which can be a huge advantage in case of investigating narrow frequency subbands. However, due to the steep cut-off, a lot of minimum zones are lost (minimum zones being less definite are handled less well by this filter, it can usually find the support points, but not all of the other start points), which makes later evaluation more difficult. Another big disadvantage of IIR filters is that some of the phase information is also lost, which is a big drawback from the aspect of evaluation. Still, it may be expedient to apply IIR filters in many cases, but their exclusive use is not expedient in the long run.

In contrast to that, the application of FIR filters helps to solve the problems mentioned above in relation to IIR filters. It has to be added, however, that due to their less precise cut-off frequency range, these filters let more disturbing signals into the filtered signal. This issue may be partially resolved by applying higher-order FIR filters. As it is shown also in FIG. 3, FBMs have also been investigated by means of wavelet analysis. Although by the help of the wavelet analysis many things are easily discernible by looking at the signal, in many cases information that is relevant for FBMs can also be extracted from the signal by other means, i.e., according to the invention, by applying bandpass filters.

We have found that of the above described bandpass filter types, FIR bandpass filters are preferably applied, because they handle change of the phase better (with smoother transitions), and also have better characteristics in general. Such filters can be applied for both bandpass filtering operations (the first and the second bandpass filter can be of course implemented applying the same filter), modifying the filtering window size.

Preferably, such an approach can be applied according to which the baseband (first bandpass-filtered signal) is covered by the natural overlap of the filter (if the baseband is not fully covered by the subbands, a lot of information can be lost; if a tight subdivision-essentially, mutually "touching" subbands—are applied, then the signal that is just outside one band will preferably appear in the adjacent one).

In such a case, therefore, a cut-off part of a given band overlaps with the other band (with the filters applied by us, this corresponds to an overlap of approx. 10%). Basically, in case of a low amount of overlap, it is not disadvantageous to apply a higher amount of overlap, because overlaps may help in recognising the start points, if, for example, a subband falls out due to external excitation. Accordingly, a certain amount of overlap—for example maximum 10-30%—may be preferred (meaning in a way that approx. 10% is present already). The applied bandpass filter does not necessarily have steep cut-off, depending on the applied type a fall of 3 dB can already be considered a cut-off.

The bandwidth of the first bandpass-filtered signal is preferably covered, to a good approximation, by the frequency subbands having subband bandwidths (applying a maximum overlap of 10% or 30% between them). Preferably such a coverage is applied that the baseband signal can be reproduced from the totality of the respective subbands.

In the second step (operational step S220), the above described signals, decomposed into frequency subbands, are investigated in a step-by-step manner for all four measured movement features $J_m$ described below, with the speed-up option that in case the value of the first measured movement feature Jim for a given episode is very small, then it is unnecessary to carry out the other three measurements. This solution can also be applied for the other measured movement features, and the order of their calculation can be changed.

Another possibility for speeding up the process, which—i.e., if instead of step-by-step scanning an optimised sampling process is applied for the search—can be decisive especially in the case of real-time measurements. If, therefore, the start points (SP; departure point or point of beginning) of some episodes (e.g., 10 episodes) are unequivocally and safely established, then the search for further start points becomes even simpler, because the measured movement features have to be investigated only in the time interval (tolerance range) having a length of 0.8-1.2 s that comes next based on our predictions. It is important, however, that after a weakly determined SP the entire time domain has to be searched through, that is, we can return to step-by-step scanning.

A confidence value can be assigned to how reliable is the finding of a minimum zone (the start point therein), i.e., how high is the probability of finding really that. This can be affected by the value of the acceptance limit (sum) relative to the threshold value (this is available already during the search, this is a first confidence, as well as its value), whether it was found in one or in more bands (or if it is supported by something, for example by phase change, in another band), and, if it was found in more bands, what is the confidence level of the multiple instances being correspondent to each other (this can be determined after clustering; it helps to determine the support points, this is a second confidence, as well as its value). In the latter case, i.e., if it was found only in one band, confidence is increased if it is supported by the change of the phase or the values of the measured movement features $J_{1-3}$. During the search, the "quality" of the detected episodes (i.e., how "good" is a particular detected episode) will be practically known, and if an episode is good, then we can also see what kind of the time intervals are, and then we can even jump and also return to continuous scanning if a lower-confidence episode is found.

Based on the above, at the end of the second step a large number of such data quartets $J_{1m}$-$J_{4m}$ are available that were obtained for multiple frequency subbands (designated with m; for the presumed location of each start point in each frequency subband, see also below) and that in all probability define SP locations (point (a); they will be the support points, see later), and also such data quartets that have more uncertain basis (point (b); have lower associated confidence according to the first confidence, but are accepted with the acceptance limit; they will be carried further as normal start points (SP)). Both types of data carry the safety (confidence) value specified based on the data obtained in course of the search operation.

The acceptance threshold is therefore a threshold that the acceptance sum must attain such that a start point can be inferred from the investigated minimum zone. For a given measurement, its value can be determined experimentally. It is preferably determined based on values of the measured movement features that were obtained in course of earlier experiments (even performed with the same fetus). The acceptance threshold must be higher than an acceptance sum obtained from these initial values; for example, it can be 130-170%, preferably 140-160%, particularly for example 150% thereof, and it can be changed if the result of the processing is not satisfactory (for example because the initial values are not satisfactory).

The third step (operational step S230) is the merging of the above mentioned data quartets falling into a tolerance range by means of clustering, in course of which the particular confidence values are also taken into account. This operation is also performed for the data specified in point b) of step 2, and based on this the order (that is still uncertain during the previous steps) can be corrected. By the end of the third step, therefore, a series of start points (initial points, starting points) is obtained, i.e., thus essentially the episodes.

The fourth step (operational step S240) entails establishing the segments making use of the starts points that have very high confidence levels as support points (base points; SupP- or TP). One (or perhaps two) missing start points in a time interval between two such support points, if it is not longer than the duration of 3-4 episodes, can be determined by interpolation with acceptable accuracy. In this embodiment, therefore, the segments are also formed (the result basically is that the episodes are identified, for example applying the episode groups, see below).

Identifying the support points (SupP) can be very useful even already in course of real-time (or in posterior off-line) evaluation. Since if we do not differentiate the support points (SupP) from normal start points (SP)—their differentiation is also not necessary for applying the episode groups—, then we will have no feedback on how strong the utilized start points are (how high are their confidences). Based on that, the support points can be helpful for example in assessing how well the particular parameters are set, i.e., they can be applied for fine-tuning thereof. They can also be indicative of "how much can be made of" a bad-quality signal.

The fifth step is the construction of the entire movement process (operational step S250) that is not only a series of episodes, but also has pauses ("intervals") between those episodes that have unrealistically long duration, i.e., essentially these are the rest periods of the fetus. FBM pauses do not exclude other fetal activity, such as hiccups. The rate of occurrence and length of such stops can be very important from the aspect of the health status of the fetus.

In the following, the decomposition of the sample into subbands is described in a preferred embodiment. The essence of this technique is that the signal is decomposed into narrow frequency subbands applying very steep filters, and then the subbands are investigated separately in order to gain some characteristic information on the chaotic signal. This is well illustrated by the time-frequency map of the start of the episodes (such as FIG. 3), wherein the start points (points of beginning) of individual episodes can be observed easily, while it can also be seen that at different frequencies they are shifted to other locations (the approach based on clustering thresholds fits with this phenomenon, as it is able to handle that what kind of shift values-starting from coincidence—are permitted). This is helped by decomposing the signal into components, because thereby the location of a large number of excluded components (i.e., components that temporarily go mute) can already be safely considered as a rest interval, that is, the departure location of a new episode. The endpoint of such an interval is thus accepted as a departure point (start point, SP).

Another possibility in searching a respective rest state is to apply a short-time targeted exclusion of the frequency component excited by an external effect (for example, an overdrive caused by other fetal or maternal effects; shortly: externally excited) that had an outstandingly high intensity based on measurements in the immediately preceding time period, and at the same time had visibly lower-than-average damping in the decaying period of the preceding measurements. Preferably, therefore, an overdrive sensor is implemented that determines the high-intensity disturbing externally excited frequency component, and excludes (intermittently, temporarily) the frequency subband including that. After the excitation related to the external effect has ceased, the exclusion can be removed.

Determining these two features allows that the strongly interfering frequency component can be temporarily excluded, or at least attenuating thereof. This method obviously assumes some correlation between two successive (i.e., expectedly "related") movements. This is also supported by that generally all episodes (as movement components) occur in a hydrodynamic space that is very similar to the previous episode. Here, the term "hydrodynamic space" refers to the moving fetal body surface, the associated—also moving-surface portions of the amniotic sac, and the amniotic fluid (an incompressible liquid). Obviously, two successive fetal movements are to a certain extent very different, but in general (which can also be tracked well in course of measurement evaluation), if the difference is not too large, then the temporal change of the hydrodynamic space will be slow, which consequently will result in excited frequency spectra that are close to each other. Based on that, it can be maintained that a deterministic effect manifests itself in the formation of rest locations, which can be exploited for determining episode locations somewhat freed from the shackles of chaotic behaviour, i.e., more effectively.

As it is apparent from the discussion above, the chaotic nature of fetal movements is almost the only sure point regarding the temporal positions of the minimum zones characteristic of the rest positions, which is, however, strongly disrupted by two factors. One of these factors is that, in certain cases, due to the shortness of the rest position, certain high-intensity excited frequency components of the above mentioned hydrodynamic system will not decrease below an easily discernible signal level for this short period. In these cases, the minimum zone remains undiscovered (such positions can be later filled by a phantom, see below).

Another problematic issue is the detection of false minimum zones, which in reality do not result from the rest state of the hydrodynamic system being investigated, but are some kinds of interference of the excited harmonic components, i.e., are generated by the random (short-term) quenching of the signal. The signal portions thus formed that seem to be minimum zones are highly disturbing, especially if they are located near an actual rest point.

Figure 5:
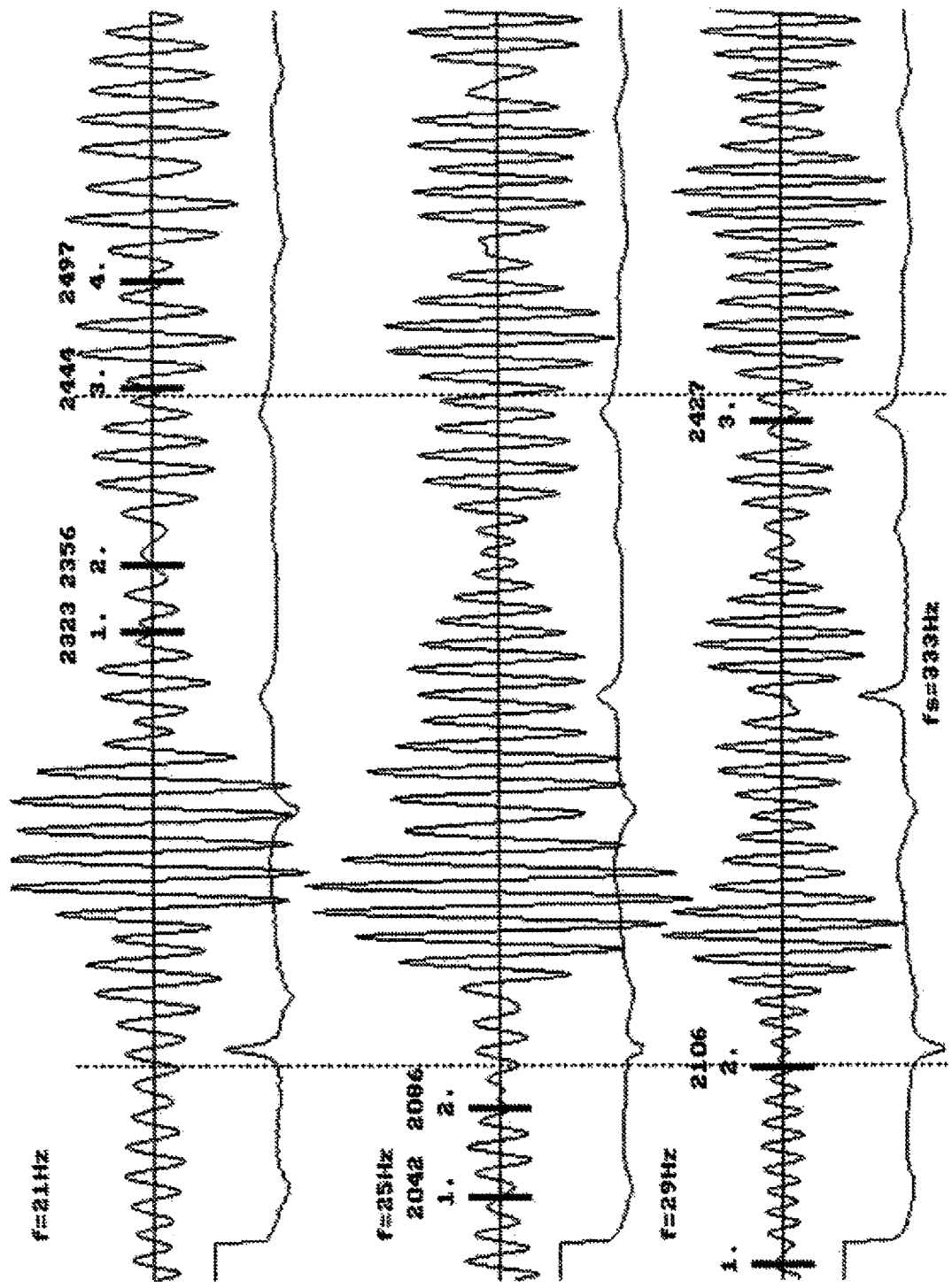
FIG. 5 shows a time function of the breathing movements obtained for three different frequency subbands, indicating the identified minimum zones and the measured curve of change of the phase.

In FIG. 5 an exemplary signal portion decomposed into frequency subbands is shown, which illustrates the above mentioned chaotic nature of the phono-acoustic signal and the appearance of false minimum zones therein. This signal portion is an example, the shape of the signal as a function of time is different, and is also modified in the case of modifying any of the parameters, i.e., only an illustrative segment is shown. In the example shown in FIG. 5, essentially the envelope curve (essentially, the change of intensity) corresponds essentially to the movement of the diaphragm of the fetus. The recorded movement signal was filtered to a narrow bandwidth around a particular frequency (in the case of FIG. 5, around 21, 25, and 29 Hz), so it comprises components corresponding to the filtering frequency. The applied filter also outputs the change of the phase, and it is also shown for each frequency subband in addition to the filtered signal. The change of the phase essentially provides information on contraction and relaxation of the diaphragm.

Those potential locations in the signal from among which the start points (SP) of the FBM periods can be selected in course of the evaluation process can be discovered with the help of the measured movement features described below. In FIG. 5, the locations of potential SP-s are indicated by dashed vertical lines.

In each of the subfigures of FIG. 5 corresponding to the various frequencies the temporal shape of the signal is shown at the top (the signal is preferably a digitized, discretely sampled signal), while the phase change of the signal that is investigated by the measured movement feature $J_4$ is shown at the bottom. In the top signal, the presumed minimum zones are determined applying the measured movement features $J_{1-3}$; in order to decide whether to accept them, the measured movement feature $J_4$, i.e., the change of the phase must also be taken into account (in this local peaks correspond to the minimum zones). Accordingly, as it can be clearly seen in FIG. 5, the presumed SP-s can be very accurately specified utilizing the combination of phase change and the measured movement features $J_{1-3}$.

At the top of FIG. 5, in the case of the 21 Hz-signal (the middle of the band is 21 Hz and the bandwidth is 4 Hz), 4 potential minimum zones can be seen considering the measured movement features $J_{1-3}$. However, taking into account the phase change curve (i.e., if $J_4$ is also considered, validation is made by the help of it) it turns out that of these points only point 3th located at sample point 2444 will be acceptable (a smaller peak can be observed in the value of the phase change, for example the middle position of this peak is assigned to the minimum zone, it specifies the sampling point corresponding thereto). Likewise, in the case of the 29 Hz-signal, the points 2nd and 3th can be accepted (such points are indicated by higher amplitude of the phase change; the point located around 2444 is indicated by the phase also in the band around 25 Hz). It is noted that the shape of the episode cannot always be identified in the filtered frequency subbands; in the band around 29 Hz, the high phase value above the text fs=333 Hz most likely corresponds to a return event.

A preferred option for evaluating the measured movement features—in addition to what was described in relation to the acceptance sum—is that respective minimum levels are established also for each measured movement feature, and the parameters may be compared to the minimum levels such that if a particular measured movement feature (for the first one, its reciprocal) falls short of these, then the evaluation of the given episode can be discarded at once.

On the other hand, a minimum level to be attained is also established for $(1/J_1)+J_2+J_3$, and in case this value is not attained, $J_4$ is not evaluated. In such a case, these parameters can "help out" each other (i.e., it is not a problem if one of them or $1/J_1$ is too low; this may improve effectiveness), so in order to be able to continue with evaluating $J_4$ it is sufficient if their sum attains the minimum level. This differentiation is a useful one also because in some respects the movement feature $J_4$ is different type from the other movement features.

The minimum levels can be compared with the initial values given in Table 1 (the exact values are of course only examples, but they can reflect the experience gained from earlier measurements that were even taken utilizing the same signal).

A minimum level can also be introduced for $J_4$ because it is not expedient to accept an episode also if the value $(1/J_1)+J_2+J_3$ is very high, but the phase value is unacceptable. Such a minimum level can also be introduced even in case a minimum level has been defined for each measured movement feature.

In sum, it is preferably not sufficient for acceptance if only a comparison with the acceptance sum is applied, i.e., a potential episode must also fulfil the conditions given by the minimum level introduced above.

The phase changes between the start points (SP-s) can be best explained by motion changes of the diaphragm, i.e., at the end of the contraction of the diaphragm and when in the relaxation phase it starts to move backwards (this is why this point can be markedly observed in the change of the phase). As FIG. 5 illustrates it well, the FBM can be obtained by the simultaneous investigation of the signals. For the episode candidate identifiable in FIG. 5 it holds true that the distance between the presumed SP-s is in the range of 0.8-1.2 s. The SP-s (and the corresponding episodes) thereby obtained are finally accepted applying clustering described below and the forming/accepting the episodes (creating the segments utilizing support points).

In addition to the above (measurement-related) aspects, in many cases another factor also plays a role in discovering of rest points. This is the so-called return point, at which the forward-direction motion reaches maximum displacement, and after which motion starts in the opposite direction. Without doubt, this time instance can be considered a characteristic state of the hydrodynamic system, and, according to the measurements, the signal intensity clearly diminishes in many cases in the broader frequency bands when this state occurs. However, this cannot be utilized for identifying the episodes, because the intensity and temporal position of the phenomenon are extremely uncertain. A reason for that can be that the dynamic system cannot attain a rest state in this short "return position". The really negative side of this is that by knowing the return point an important piece of information could be obtained on the movement process, and thus potentially on the change of the state of the fetus during the movement.

In our experience, the above described problems related to the signal can be effectively avoided by means of the measurement method applied according to the invention, i.e., by systematic scanning of the entire frequency spectrum of the generated signal, which is achieved by several, essentially contiguous (abutting) frequency subbands. The entire baseband frequency spectrum can be determined by measurement, but it is not necessary, since by applying a sufficiently wide frequency band it can be made sure that the informative frequency values are present in the baseband.

For generating the investigation signals (test frequency bands) according to the invention, therefore, the baseband is decomposed into very narrow frequency subbands that have a preferred width of 1-6 Hz. It is not necessary that the selected bands overlap each other, but it is not excluded to apply overlapping bands. It is an important aspect, however, that the baseband signal falling into the frequency range 15-35 Hz (or preferably 19-31 Hz) must be "scanned" totally with the help of the subbands. Therefore, in the case of decomposing ("channelling") the signal into subbands, filters having only a single bandwidth are applied; however, if FBM detection was unsuccessful, the method can be carried out again after adjusting the filter's bandwidth.

The essential feature of applying the investigation bands (the test frequency bands, i.e., the frequency subbands) is that, in case some component or group of components have not yet dampened to the sufficient extent in the investigated time interval around the presumed minimum zone, that is, a residual signal can still be found, then it is highly probable that it is present in one (or more) narrower frequency subbands, i.e., the fall in intensity will be identifiable in the other frequency subbands. The aim of this investigation is to find the band that has the smallest, preferably near zero residue. If the residue is under a given threshold value, then the presumed minimum zone is accepted, but is checked further. In case of findings elsewhere, the following rules are followed:

1. In the case of an identical (or close, i.e. within clustering threshold value) time instant but different frequency subbands and a low residual signal, the minimum zone will be accepted as a different type of manifestation (a support point, SupP, see further below), and it is checked further.
2. The previous case, but it appears in a distant time instant (that is, the minimum zone can be identified in only a single band); in such a case the minimum zone is accepted as a normal start point (SP), but it can be an other, non-evaluable minimum zone, or even an extreme level caused by a return event.
3. If a minimum zone cannot be found in the subsequent time interval (that has a length of 0.8-1.2 s and is specified applying time-shift prediction) in any frequency subband either, then the missing start point of the episode is evaluated further by inserting a substitute (phantom).

A short time interval of an investigated sample is shown in FIG. 5, wherein the minimum zones can be seen in three different 4 Hz frequency subbands. The first accepted minimum zone (indicated by a dashed line, i=2106) were found by two scanning frequency subbands (the frequency subbands around 25 Hz and 29 Hz); the second minimum zone was identified applying two frequency bands (and its presence can be detected, in the phase curve, also in the third), and thus they are most probably real minimum zones, while the length of the discovered episode is (calculating with a sampling of 3 ms) $t_e=(2444-2106)/333=1.015$ s.

In the following, the process of establishing and accepting minimum zones is described.

The recurrence time of the episodes falls in a known range, but in order to use them the exact position of the episodes, i.e., the start point (which could simply be referred to as SP) must be known. One of the possible ways (virtually the only one) of obtaining that point is applying the minimum zone occurring after the previous episode. During the above described pauses there are in principle no signals originating from FBM-s (signal intensity falls), so this typically short-interval can thus be regarded as a rest state, which however cannot be taken as devoid of any signal in reality, which of course makes it extremely difficult to identify it. That is because these intervals are typically very short, and therefore the sounds generated by the movement in the activated oscillating system will obviously have some decaying power components These so-called "residual" components-which naturally have stochastic frequencies and power-make it problematic to identify the minimum zones, because in certain cases the combined power of the measured signals can be comparable to the other minimum zones (resulting for example from interference) of the episode.

Although the endpoint of an appropriately "silent" minimum zone is considered the assumed start point of the next episode, but sufficiently high confidence is required for such an assumption. The cycle time values can be utilized for finding the subsequent SP-s. In the case of an SP that has been already well determined, according to the prediction the next start point is searched in the interval between 0.8-1.2 s after the identified SP, but due to method based on recurrence time, in the case of a false SP the episode series can be completely shifted, yielding consistently false data. Decomposing the signal to components, and implementing essentially separate measurements for these test frequencies is aimed at resolving this problem.

As can be seen from the above, the easiest possibility for recognizing the episodes is offered by identifying the signal minimums corresponding to the rest positions. Due to the false minimum zones found in course of the search process, a so-called acceptance sum (AH, can also be called an acceptance limit) is introduced for evaluating the respective points, which is obtained for the signal $s_m[i]$ measured in the m-th frequency subband as a weighted sum of four movement features weighted sum ($J_m$) measured in different ways.

As can be seen from the introduction of measured movement features below, different values may correspond in each frequency subband to each measured movement feature in accordance with the fact that signal shapes are different in the different frequency subbands.

For a minimum zone with a length $d_1$ (interval between $i_2$-$i_1$ sampling points)$\approx \lambda_m$ (the wavelength at the given frequency) the first acceptance condition is obtained by taking the absolute sum of the intensity values of the residual signal (divided by the length of the interval)

$$J_{1,m} = \frac{\sum_{i=i_1}^{i_2} \text{abs}(s_m[i])}{d_1};$$

this value, therefore, comprises summing over a short interval (in the figure there can be seen the length of a wavelength at the given frequency). Applying a similar formula, the absolute value of the steep rise interval coming after the minimum zone, summed over the time interval $d_2=(i_3-i_2)$ is $$J_{2,m} = \frac{\sum_{i=i_2}^{i=i_3} \text{abs}(s_m[i])}{d_2};$$

(see below the value obtained for $i_3$); this interval starts at $i_2$ and is targeted at "capturing" the rise interval. The third condition is the intensity that can be measured over the entire length N=1 s of the episode (this can be set for example based on previous investigations, for example by applying the start point distance average that is discussed elsewhere), where $d_3$=Fs (i.e. equals the sampling frequency corresponding to a given length).

$$J_{3,m} = \frac{\sum_{i=i_2}^{i=N} \text{abs}(s_m[i])}{d_3};$$

In the case of the minimum zones that are considered to be resting type, the phase angle of the signals generated by the movement is changed significantly, which provides a further possibility for confirming the existence of the episode applying the following short-term DFT (discrete Fourier transform) formula (that is values are summed only between $i_1$ and $i_2$, in the minimum zone). The function related to the signal phase is obtained by taking the phase of the principal signal shown in FIG. 5 (i.e., of the upper one of the two signals). This quantity (parameter) gives the phase change in the given interval (between $i_1$ and $i_2$ i.e., in the minimum zone) with respect to the phase shift (Po) of the entire episode. This is checked, essentially in a way amounting to some kind of moving average filtering, taking into account changes in a local manner.

$$J_{4,m} = arctg(\varphi_0) - arctg \frac{\sum_{i=i_1}^{i_2} s_m(i)\sin(2\pi f_m ki)H(i)}{\sum_{i=i_1}^{i_2} s_m(i)\cos(2\pi f_m ki)H(i)};$$

where in this case $f_m$ is the center value of the applied frequency subband, of which $\varphi_0$ (a frequency-independent value, which can be obtained from the signal; in the second part of the formula the values are investigated in the particular frequency subbands in a frequency-dependent manner) is the phase shift during a sampling, while H(i) is the Hann window function with a given width that is applied at the given time instant (it is decomposed into its Fourier series for this function), and k=1/Fs is the radian constant. In the case of the rest points that are assumed to be valid, the amount and temporal distribution of the phase shift has to have a given value (in practice, this means that the distance between the extrema of $J_4$ is preferably identical to the FBM-s; this condition is typically well satisfied). $J_{4,m}$ is therefore a measured movement feature derived on the basis of the (frequency subband) deviation (occurring in the particular frequency subbands) from the cumulated phase shift of the episode.

Based on the measured data mentioned above, an acceptance sum $A_{H,m}$ can be calculated for a given presumed episode, with the value thereof being above a given level (acceptance threshold) proving with high probability that the presumed minimum zone really corresponds to a rest point and that the other parameters thereof are also acceptable, and, as such, it can be the start point of a conditionally accepted episode at a given time instant and in a given frequency subband. Introducing the weight factors $w_{1-4}$, the various threshold values are taken into account similarly in the scoring system of $A_{H,m}$ with a reciprocal value also being utilized:

$$A_{H,m} = w_1/J_{1,m} + w_2 J_{2,m} + w_3 J_{3,m} + w_4 J_{4,m}$$

The threshold values corresponding to the measured movement features $J_m$ (acceptance features), the time instants $i_2$, $i_3$ and N parameter applicable therein, and the value(s) of the weight factor(s) depend on the breathing movement, age, weight, and the current position and status of the fetus. Consequently, they are not fixed values, only initial (default) data that can be modified if, in course of a given investigation, too few minimum zones are detected, or if there are irrelevantly many accepted minimum zones. In such cases, however, the complete check need not be performed again, i.e., only the threshold values have to be redefined, and the calculation has to be performed again utilizing the new constants.

In the above described embodiment, therefore, the following measured movement features are applied in a step adapted for generating a frequency-dependent start point list:

a first measured movement feature $J_1$ specifying an intensity of a residual signal in a first interval around a start point, a second measured movement feature $J_2$ specifying an intensity of a rise in a second interval that follows the first interval, a third measured movement feature $J_3$ specifying the cumulated (entire) intensity of the episode in a third interval that encompassing the second interval and has a length corresponding to a theoretical episode length, and a fourth measured movement feature $J_4$ derived on the basis of the frequency subband deviation from a cumulated phase shift of the episode in the first interval.

In this embodiment, furthermore (in line with the formula above) the acceptance sum is a weighted sum of the reciprocal of the first measured movement feature $J_1$, the second measured movement feature $J_2$, the third measured movement feature $J_3$, and the fourth measured movement feature $J_4$.

The next step of the investigation comprises "cleaning" the series consisting of different time values obtained applying different subbands by means of clustering, in course of which the time values in the different frequency subbands that have smaller difference than a given clustering threshold are merged. The clustering threshold is of course much shorter than the episode search time period, and is also shorter than a presumed episode. Its value can be set experimentally. Its value can be e.g. compared to the start point distance average (mentioned in the foregoing in this description) that is an estimate for the length of a given episode. As this threshold value can be updated in course of processing the signal, the clustering threshold may also be updated. Accordingly, its value is preferably 5-20%, more preferably 8-12% of the start point distance average.

The result of clustering will already—with high certainty—be the start point of the episode (start points found in multiple bands will become support points), which can indirectly be considered as the end of the previous episode. This is because the temporal position of that cannot be accurately determined; however, this is essentially irrelevant for the purposes of the investigation, as the intervals in question are extremely short and do not provide any information on the health status of the fetus. In addition to the acceptance limit of the presumed minimum zones, weighting is also assigned in course of clustering to the presence or lack of further minimum zones inside the time window characteristic of the FBM movement (i.e. that a further/previous minimum zone has been found within a certain interval, this makes it a support point). Clustering also affects (based on the locations of the other minimum zones) the mode of timing that is selected for further processing of the given start point. Applying this step, the number of minimum zones that are irrelevant from the aspect of FBM-s can be reduced. Minimum zones indicating an FBM start that have not been discovered by clustering can be supplied with the help of a method set forth in the following (based on applying phantom start points).

As a result of clustering, the potential minimum zones are established (identified), based on which the FBM episode can be verified later (and can be utilized for posterior evaluation, see above). The minimum zones are therefore classified into three categories:

1. support points (SupP) having high-confidence: minimum zones that can be found in multiple subbands,
2. normal start points (SP): minimum zones that have been accepted based on the acceptance sum in any of the subbands,
3. phantoms (PH): FBM start (departure) points that could not be found in the subbands, but their existence is assumed based on the other minimum zones (these have not trace in the previous steps).

Figure 6:
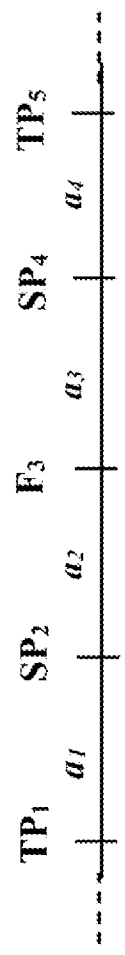
FIG. 6 illustrates the merging of minimum zones applying support points and phantoms.

In the case of the segment shown in FIG. 6, two SupP-s encompass four episodes, where the SP between the two middle episodes cannot be evaluated, and therefore the durations $a_2$, $a_3$ cannot be calculated (before the insertion of the phantom $F_3$ shown in FIG. 6, the intervals $a_2$, $a_3$ cannot be interpreted). Based on interpolation, the position of the phantom $F_3$ is determined by the midpoints of the two mentioned intervals; based on that, the position of the phantom can be preferably obtained for example applying the following formula: $F_3=SP_2+1/3(a_1+a_4+(a_2+a_3)/2)$.

In the following, the SupP and SP are not distinguished, but both are considered such minimum zones that have been detected, and in an embodiment, the below described investigation is applied on them. Based on the minimum zones included in the list, a series of so-called "triplets" (or in an alternative term, "episode triplets"; signal portions extending over different than three episodes may also be distinguished) is established that are in theory bracketed by four real minimum zones included in the list, but are conditionally accepted also in case one of the two middle minimum zones is absent. See below an approach to the related rules (taking 0.8 and 1.2 seconds as the lower and upper limit of the episode length).

Figure 7:
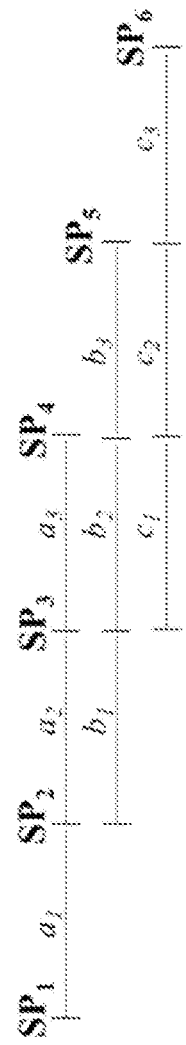
FIG. 7 illustrates the merging of the obtained triplets into a complete sequence (epoch)

The mutually shifted temporal positions of the triplets is shown in FIG. 7. In an example, a minimum zone (m=1) that can be located at an assumed start time instant $t_1$ (which is for example the middle of the zone) is selected in course of generating the triplets. This will be the departure point (start point) of the first presumed episode. If $(t_x-t_1)<0.8$ s for the time instant $t_x$ of the next minimum zone, then this cannot be the start point of the next episode, so the process continues with checking the next element of the list (m=2; i.e., we try to start a triplet at this element). In case the above difference is greater than the preset value (i.e., it is not between 0.8 and 1.2 s), then the next step is checking for the exclusion condition $(t_x-t_1)>1.2$ s. If this condition is fulfilled, then, although the location just found cannot be the start point of the next episode, but by inserting a phantom the episode can be "kept alive", i.e., in such a case the episode will work as a second existing minimum zone. In such a case a phantom is inserted, and—if $t_x-t_1$ is smaller than 2.4 s—the minimum zone at the time instant $t_x$ is considered a third accepted start point (see also the description below related to the lower and upper limit; with the present values we also provide examples for the values of the limits).

Thereafter—in case the previous point was a normal, accepted start point (if not, then we continue the process with the fourth point)—a search is performed for the next start point (m=3) that is accepted according to the timing conditions described above; but in case the triplet already contains a phantom (F>0), then the triplet is conditionally put in the "to be discarded" group. Finally, the fourth (m=4) minimum zone must also fulfil the two timing conditions. If these conditions are fulfilled, the first triplet is formed.

The next triplet (shifted by one episode) is built similarly, and, if a phantom need not be applied for it, then the phantom of the preceding triplet becomes automatically realized (verified). However, if a phantom has to be applied also for this next triplet, then the preceding triplet (which contains a phantom and is thus conditionally discardable) is deleted from the queue. Because the next triplet is shifted by one episode, a single new start point is inserted therein. If the preceding episode had a phantom and the newly included start point would also be a phantom, then by introducing the next triplet—almost as in the case of a double check—the preceding phantom will also be discarded, and the preceding triplet—only as a triplet, not episode—findings, i.e. the valid episodes therein—will be deleted. If the next triplet has an accepted departure point (start point), then—also like a second check—the phantom of the preceding triplet becomes accepted.

Preferably, such a double investigation (double check) is required in the case of all phantoms.

Therefore, a series of four successive SP-s without a phantom (PH) between them clearly verifies a triplet (i.e., it will be a "clear" triplet, having only accepted start points). If any one of the four SP-s is a phantom, then a next, fifth SP—that has preferably been already accepted in course of the clustering process—is required (i.e., according to above, it is required to check the next triplet), which is able to verify all four components of the (preceding) triplet being investigated (thus making the phantom a valid start point). As it can be discerned from FIG. 7, this fifth SP will be included as the last member of the second triplet. Therefore, the second triplet can verify all components of the preceding triplet in case the first triplet contained only one phantom.

The primary aim of applying triplets (episode groups) is to check the SP phantoms included in the list, and, if necessary, to add them to or remove them from the final list. In a highly preferred manner, this allows that the unique breathing movements can be considered as parts of a process, preventing the SP-s that have been left out or detected incorrectly from being ignored (thereby, episode detection will be way more effective).

The 3 intervals bracketed by the triplets is a very advantageous choice for finding the SP phantoms, but along this principle of course more than three, i.e., even 4 or 5 intervals can be merged in order to discover intermediate phantoms; however, it is not expedient to handle too many SP-s together, because in the case of too many phantoms the efficiency of the method is reduced.

In line with the description above, further embodiments can be distinguished. The features detailed below also cover the embodiment described above.

In an embodiment, a lower time period limit and an upper time period limit of a time period of the fetal breathing movement episode are determined (that is, a lower and an upper limit is determined for the episode length, like in the example above), and the episode search time period is twice as the upper time period limit (that is, the upper limit and the above introduced episode search time period are interrelated; accordingly, the second identified start point is searched over an interval with a length equalling twice the maximum length of an episode, this was the case in the example above), and if a start point distance between the first identified start point and the second identified start point is between the lower time period limit and the upper time period limit, then the first identified start point is a valid start point (this is a "normal", valid start point with a length falling between the limits, with a corresponding valid episode), if the start point distance between the first identified start point and the second identified start point is between the upper time period limit and the episode search time period, then the first identified start point is a valid start point, and at least one conditional start point (that can also be called a phantom or presumed start point) dividing the distance between the first and second start point to equal distances is identified between the first identified start point and the second identified start point in such a number, with which the equal distances are nearest to a start point distance average parameter (these two identified start points would be too far from each other, but still close enough such that their distance can be filled up with one or more phantoms, i.e. an effort can be made for "saving" the episodes within the time interval between them), if the start point distance between the first identified start point and the second identified start point is smaller than the lower time period limit, then the investigated start point is an invalid start point (this episode would be too short, so it is discarded; the start point does not correspond to a breathing movement episode; because the search is performed over an interval with a maximum length equalling the episode search time period, another start point can come therein, so it is already not necessary to discard the too long durations; if this condition was not present for the search, then the durations longer than that—i.e. longer than the durations wherein the phantoms can still be accepted—would also have to be discarded).

When placing the conditional (phantom) start points, the number of episodes that would theoretically fit between two identified start points (as it will be seen, this number is typically one or two) is determined by the lower and upper time period limits.

The number of phantoms included is made dependent on the typical episode length of the episodes of the given signal, i.e., on a start point distance average. In the case of online (on-the-fly) processing, at the start of signal processing this average parameter can be an initial value obtained from previous measurements (even of the same fetus), or can even be a constantly updated average value (that is updated taking into account the length of the episodes deemed valid). In the case of offline (posterior) processing this average can be obtained before evaluating the phantoms, for example taking into account the average of the lengths of those episodes that have lengths that originally fall between the lower and the upper time period limits (i.e., of course not taking into account the episodes that are affected by phantoms and that are too short). This average value can also be applied in the case of the above introduced measured movement feature $J_3$ (parameter N).

Based on the start point distance average that was determined in some way, therefore, the number of conditional (phantom) start points that have to be identified (i.e., have to be recorded at a given position as a start point, have to be assigned a position) between the first and the second identified start point can be determined. This start point or start points is/are placed at equal intervals from the identified start points and also from each other (if there are more). The value of this interval is established for each number of start points to be inserted (typically one or two), and based on that, it is decided which of the values would fall nearer to the average value (it can be below or above the average). In theory, thus, even more than two phantoms can be included, but that requires a very small average value, which is not typical.

As it was shown in the foregoing, the lower time period limit is preferably between 0.6 and 1 seconds, more preferably between 0.7 and 0.9 seconds, and is particularly approx. 0.8 s. Likewise, the upper time period limit of the episode length is preferably between 1 and 1.4 seconds, more preferably between 1.1 and 1.3 seconds, and is particularly approx. 1.2 s.

According to the above approach, the lower and upper time period limits are not interrelated; this is why their preferred values are specified separately. In further embodiments they may be interrelated, whereby the maximum number of phantoms that can be included can be a determined value.

In an embodiment, the lower time period limit is larger than half of the upper time period limit. Accordingly, the value equalling half the upper time period limit is already outside the interval, so in this embodiment, depending on the start point distance average, one or two phantoms are included in case there is a possibility for including a phantom.

In a further embodiment, the lower time period limit is larger than two-thirds of the upper time period limit. In such a case, only a single phantom can be included.

According to our experiments, in the case of interrelated limits the first approach is a better fit for real situations (the lower time period limit is larger than half of the upper time period limit). It is also preferable if the lower and upper time period limits are not interrelated.

In an embodiment, episode groups are applied for episode validation (see above the description of episode triplets). In the case of applying such episode groups, in the episode validity determining step an actual (current) episode group formed from the second identified start point towards the first identified start point, comprising episodes in a number of an episode number, and a previous episode group formed from a first start point situated towards the first identified start point from the second identified start point and comprises as many episodes as an episode number are applied, in case the start points are available (the latter means that the episode group is applied if it can "reach back" to a required number of episodes, i.e. those episodes are already available; if they are not yet available—at the start of processing—then the phantom investigation is not performed, but by "sliding" the episode group the phantom can also be "reverted"), the second identified start point and further start points bracketing the episodes of the actual episode group corresponding to the episodes of the actual episode group, and the first start point situated towards the first identified start point from the second identified start point and further start points bracketing the episodes of the previous episode group correspond to the episodes of the previous episode group, (i.e., if episode triplets or episode groups containing fewer or more episodes are applied; a start point is therefore either identified or conditional (phantom); episode groups can also be considered to contain the start points; in the case of a large number of phantoms the episode group containing the second identified start point does not necessarily contain also the first identified start point), if there are valid start points and a single conditional start point among the start points corresponding to the actual episode group, and there are valid start points and a single conditional start point among the start points corresponding to the previous episode group, then the conditional start point corresponding to the actual episode group is changed into a valid start point (accordingly, for turning a conditional (phantom) start point into a valid one the above defined current and previous episode groups must also be considered), and the valid episodes of the phonocardiographic signal of the fetal breathing movement are given by the episodes starting at a valid start point (because the corresponding phantoms are turned into valid start points, by counting the valid start points the number of valid start points is obtained; so, episodes that are not investigated (untested) for the moment are distinguished from valid episodes (i.e., episodes that have been declared valid)).

The phantom is not changed if a respective single conditional start point is found in both the current and the previous episode group such that, of the start points of the previous episode group, the earliest start point is the conditional start point. However, this situation is preferably not subjected to investigation, so such phantoms are (correctly) not "turned" into valid ones, because they would be the last member of a phantom group consisting of multiple phantoms, so would be part of an episode group starting with a phantom, which is not "reversed". Accordingly, the two single conditional (phantom) start points discovered above in relation to turning a start point into a valid start point are manifestations of the same phantom start point appearing in two different episode groups (typically the last-but-one in the current group and the last one in the preceding group).

The present treating of phantoms is analogous to what was set forth in relation to phantoms in the foregoing sections of this description. According to the above described approach, the one or more phantoms are considered as they emerge, because they are located between the first and the second identified start points. Therefore, if only a single phantom has been placed, and another phantom has also not been found in the previous episode group (it was set forth above that the previous group is investigated first and then the subsequent one, but this is analogous to that), this particular phantom can be turned into a valid start point. If two or more phantoms have been placed, then they cannot be turned into valid start points (they typically cause a short dropout of the signal), but this situation is not even subjected to investigation in this approach (only an episode group with a single phantom can be verified).

Each episode group is recorded shifted by one episode, thus enabling a process-like evaluation. According to the above classification of the start points and also to the phantom placement rules, episode groups of the following types can be differentiated (i.e., successive episode for each start point, i.e. groups are recorded shifted by one start point; the episode number is the same for all episode groups, preferably it is at least three and is preferably at most five):

the investigated episode group is a valid episode group if all of the start points bracketing the episodes of the episode group are valid start points, the investigated episode group is declared a temporarily valid episode group in case the start points bracketing the episodes of the episode group—i.e., belonging to the episode group—comprise a single phantom start point, and if the start point following the start points bracketing the episodes of the episode group is a valid start point, then the phantom start point is turned into a valid start point, and the temporarily valid episode group is declared a valid episode group, if the start point following the start points bracketing the episodes of the episode group is phantom start point or an invalid start point, then (it cannot be verified also in case the next start point is an invalid one) then the temporarily valid episode group is declared an invalid episode group (these steps are carried out in course of the method for the group comprising a phantom, as described to the above, in a single step preferably already from the direction of the next identified start point, because an intervention is made only if the phantom start point becomes a valid one, as this establishes a valid episode), the investigated episode group is an invalid episode group if the start points bracketing the episodes of the episode group comprise more than one phantom start points or an invalid start point (that is, an episode group that comprises an invalid start point cannot be valid).

As it was described above, episode groups are preferably episode triplets that comprise (exactly) three episodes (they can also be called episode triplets, triplet episode groups or simply triplets).

After the FBM investigation is finished, the FBM episodes that have already been accepted are merged into an epoch. The point-like dropouts caused by the phantoms may still be accepted or definitively rejected, applying one last investigation condition, with the help of the FBM rate obtained for the entire signal. If there is an interruption between the episode groups (for example an interruption that cannot be verified by placing a phantom therein), then the signal portions that are divided by the interruptions but contain a large number of episodes can be considered as separate epochs.

A great advantage of FBM segments verified by triplets is that the points found in the SP list can be considered as parts of a process (SP-s that are not accepted in triplets should also be considered; with the help of the triplets a given SP/episode can essentially be accepted multiply), so, applying the interpolation method-based on triplets or other multiple-segment groups-utilized in our method, in an extremely preferable manner a much more accurate picture of the FBM epochs detectable in the phono-acoustic signal can be obtained. With the help of the data thus extracted, a very accurate picture of the dynamic changes of the FBM is obtained.

Based on large number of samples measured in course of our experiments, the exemplary values of the constants applied for the calculations are included in Table 1, which, in all cases, signal levels predicted from results obtained for the preceding 10 episodes, i.e. the values are the initial (default) values of continuously variable data related to the current status of the fetus.

TABLE 1

| Constant | Default value |
| --- | --- |
| $i_3$ | 0.13 s |
| N | 1.0 s |
| $J_{1,m}$ | 0.13 |
| $J_{2,m}$ | 28 |
| $J_{3,m}$ | 26 |

Figure 8:
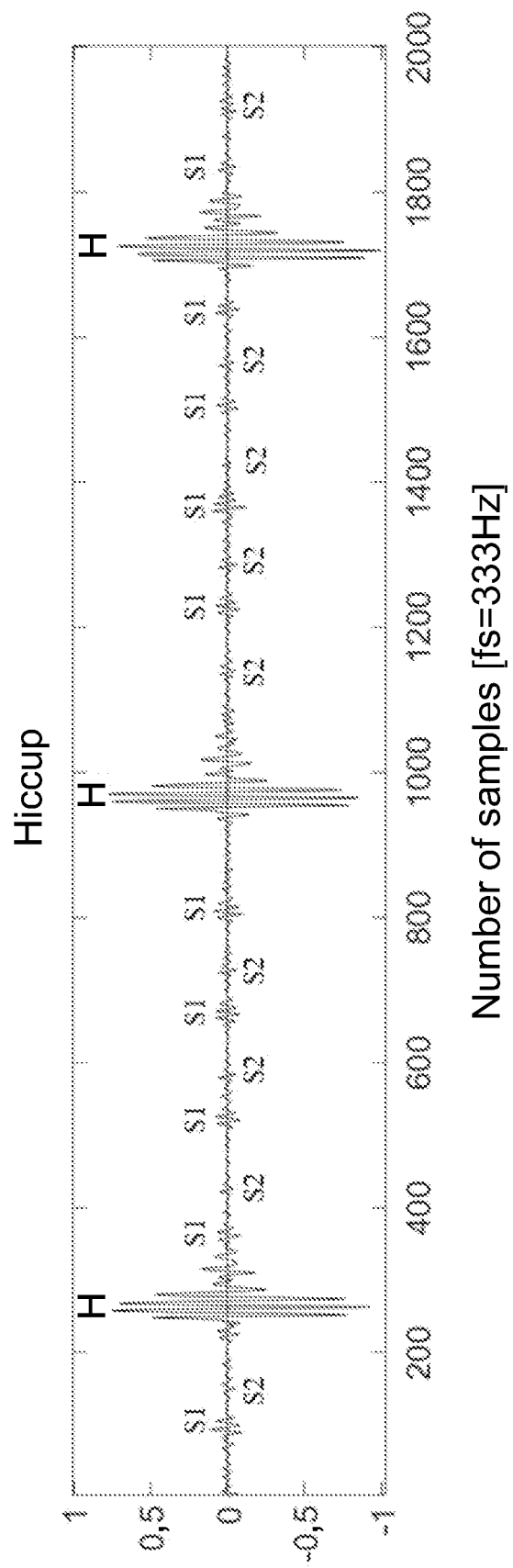
FIG. 8 shows the time function of the sounds of fetal hiccups.

In the following, discovering of hiccups is described. As it can be understood based on FIG. 8 (preferably in comparison, for example, with FIG. 3, which also shows the heart sounds and the FBM-s), the sequence of fetal hiccups consists of very short-term signals ("bursts", i.e., sudden, high-intensity signals) having a significantly higher frequency than the frequency of fetal movements, with typically 1.5-2.5-second-long intervals between them. Due to the signal shape characteristic of hiccups, hiccup recognition poses no problem at all, since it is completely different from the signal shape of fetal breathing movements discussed above, and also from signal shapes corresponding to other (random) fetal movements.

In course of measuring fetal heart activity (fPCG), fetal hiccups can be detected as a sudden impulse change, i.e., a high-intensity signal. The distance between hiccups is longer than the distances between fetal breathing movements, but individual signals are observable on a shorter time interval. The intensity of the signals can usually be comparable to the intensity of other fetal activities with highly variable temporal position and frequency, but in comparison with the fetal breathing movements it they can be observed as a less ordered stereotypical fetal activity.

As it was mentioned above, fetal breathing movements are measured with a small acoustic sensor placed on the mother's abdominal wall that must have a transfer bandwidth of approximately BW=15-35 Hz (or more particularly 19-31 Hz). If a conventional phonocardiographic sensor (measuring head, e.g. Fetaphon2000) is applied as a sensor, then this measurement setup—complemented with a suitable (smart) evaluation unit—will be capable of determining fetal movements, hiccups, fetal heart rate and related indices, fetal heart murmur, and finally, the split of fetal heart activity (a temporal difference between the activity of the left and right sides of the heart that signals disease) in the home of the patient, without any temporal limits. Thereby, a complex investigation can be provided utilizing a single device—adapted to apply a suitable method—for monitoring the fetus (keeping track of FBM, FHR—fetal heart rate, hiccups; maternal and fetal movements and heart murmur), naturally—in line with the object of the invention—emphasising the determination of FBM-s.

In an embodiment of the method according to the invention, determining from the phonocardiographic signal (one or more of the following):

fetal heart rate, and/or fetal hiccups, and/or fetal heart murmur, and/or maternal effects on the fetal breathing movement are filtered out in course of processing the phonocardiographic signal.

In relation to the treatment—i.e., some kind of special optimization—of the subbands the following is noted: The potential SP-s that indicate the start of the episodes can be discovered with the help of the FBM features. However, because the spectrum of the SP-s (i.e., the frequency at which they can be detected) also changes continually, further subbands are applied (between 19-31 Hz) in the already filtered signal (see above, for example 4-5 subbands with a bandwidth of 4 Hz).

In course of the evaluation, in many cases a so-called dominant test frequency can also be detected. The term "test frequencies", therefore, refers to the predefined subbands wherein the search for the SP-s is performed. The subband corresponding to the dominant test frequency is the subband wherein currently the given SP can be well detected. Based on that, the term test frequency range is also used.

The dominant test frequency continually changes from time to time, while the SP-s can be clearly detected in the spectral vicinity thereof. In course of discovering the FBM-s, the temporal and spectral distribution of the investigated potential SP-s can also be determined (i.e., the number and mutual distance of SP-s in a given frequency band is determined, based on which an overall picture is obtained of the SP-s).

Final evaluation can be simplified from a number of aspects, and can also be made more effective, if these dominant test frequencies are also taken into account. By applying dominant test frequencies, the process is modified in that we primarily focus on those frequency bands-temporarily excluding all other subbands—in which the potential SP-s discovered on the basis of the FBM features determined earlier were detected at greater proportion compared to other subbands. Thereby, the number and size of the subbands can be optimized, which may greatly facilitate evaluation and data processing. In line with the foregoing, it is possible to determine the FBM episodes also independent of this optimization.

Like below, in general as many as 5-15, preferably 5-10, particularly preferably 8-10 earlier episodes can be taken into account for selecting the dominant frequency (that is, if the subband corresponding to the dominant frequency does not change for this many episodes, then the others can be temporarily ignored as described below; usually that many episodes can be considered contiguous; of course they may overlap, but the FBM-s can vary structurally to too great an extent, so it is not necessarily worth using a time window longer than that). Data on the "potential" SP-s (in time and frequency) are of course saved and stored, based on that the newer dominant frequency bands can be estimated continuously; however, in course of the acceptance primarily only one dominant test frequency is applied. If the frequency bands are very balanced, then optionally a greater number of them can be taken into account, but basically they will amplify each other.

This method essentially has a role in determining the support points (SupP) mentioned above, and other SP-s. Thus, those test frequencies that "perform badly" anyway are ignored "for a short time", but for determining the current dominant test frequency we keep utilizing the data calculated therein. To put it in another way, the entire frequency band is being monitored between 19 and 31 Hz, but for determining the SP-s actually that test frequency band is taken into account wherein they can be clearly detected otherwise, and we stay with this band until a subsequent SP is found in this frequency subband. After that, we return to examining all subbands.

In the case of uncertain episodes, sectors can be applied in the FBM-s as follows: In certain cases, the question may arise if the episodes bracketed by the SP-s really designate a valid FBM episode. Primarily, this issue arises when the spectrum of the signal being investigated is affected by a continuous external disturbing effect. In order to remove the uncertainty, the continuous intensity change of the FBM episodes can also be determined in an adaptive manner in response to the external effects (see the description below).

For accepting uncertain FBM episodes, so-called "sectors" can also be applied. The essential feature of this method is that the episode under investigation is divided into N equal portions called sectors. The intensities of the individual sectors are determined by means of the integral of the Hilbert transform of the signal (the Hilbert transform of the signal practically returns the envelope curve of the signal, which is then summed up, or in our case, integrated, cf. FIG. 9; for the Hilbert transform see for example Frederick W. King, Hilbert transforms, Volume 2, University of Wisconsin, Eau Claire, Cambridge University Press, 2009):

$$sc(n,i) = \int H[s(n,i)]$$

where sc(n,i) is the intensity of the investigated sector, n is the index of the episode, and s(n,i) is the signal curve of the given sector. Based on the 8-10 episodes that were accepted earlier, the current weight factor can be defined as:

$$w(n, i) = \frac{1}{K} \sum_{n-K}^{n-1} \frac{1}{sc(k, i)}$$

where k is the running variable, and n-K is the index of the initial episode. The formula defines a weight factor for each sector of an episode. K designates the number of regions applied for initializing the weight factors; according to the foregoing, its value is particularly preferably 8-10, in general 5-15, preferably 5-10. The parameter w(n,i) is essentially the reciprocal of sc(n,i), i.e., the reciprocal of the average of the past K episodes.

Figure 9:
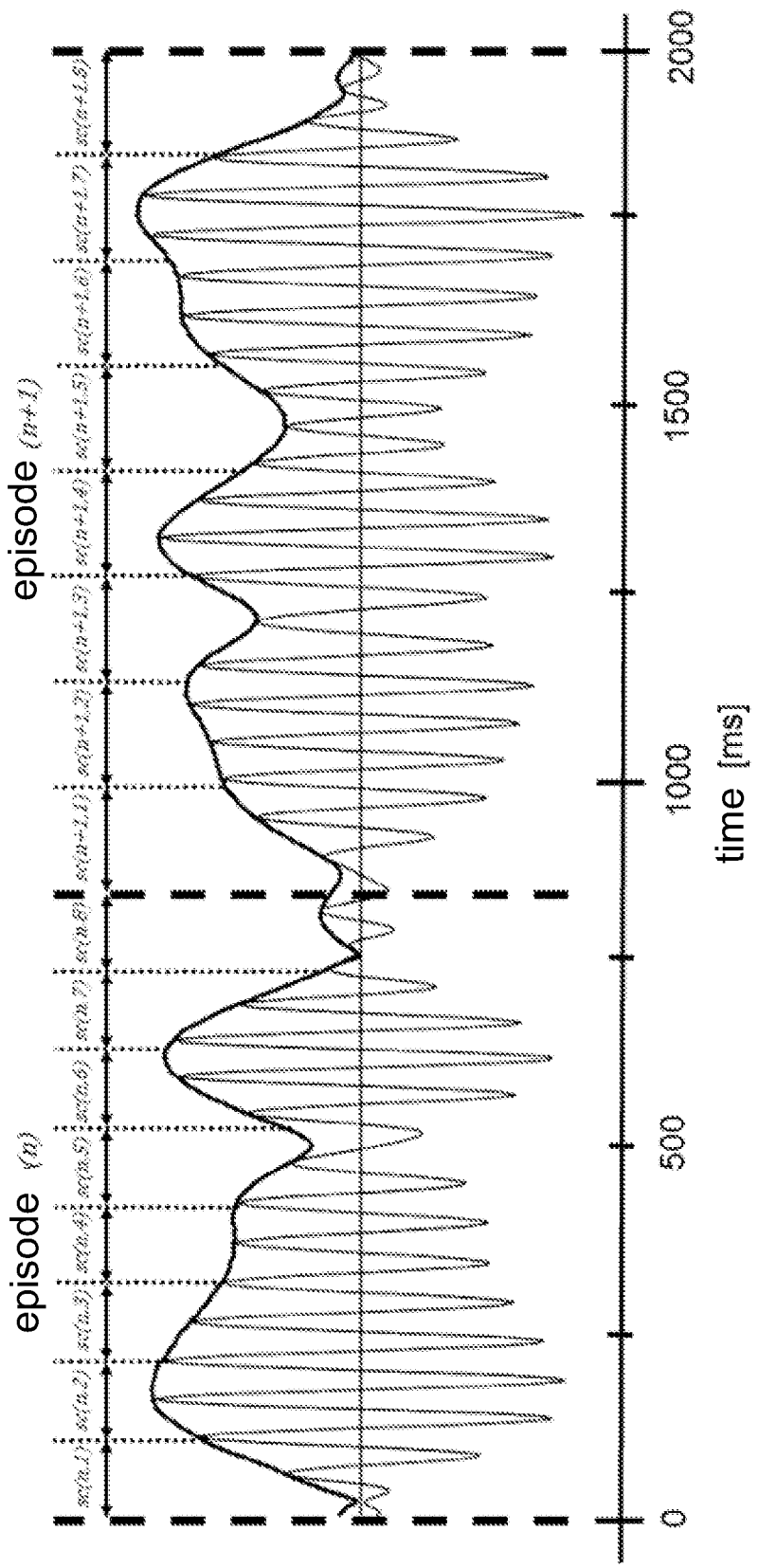
FIG. 9 is a diagram corresponding to an embodiment of the invention.

The bandwidth applied in FIG. 9 is 20-30 Hz that is within the above, slightly wider band of 19-31 Hz. In FIG. 9, exemplary episodes are illustrated (n and n+1 episodes), and the sectors are shown in each episode (each episode is divided into 8 parts), and the intensity of the sectors (sc) is shown above them.

The sectors and episodes can be accepted based on the weight factors. We introduce the parameters $$c(n, i) = sc(n, i)^* w(n, i),$$

$$C_T = \sum_i^M c(n, i)$$

where c(n,i) and $C_T$ give the confidence of the sectors and the entire episode, respectively (that is, evaluation can be performed sector-by-sector, or alternatively for an entire episode; since w(n,i) is the reciprocal of the average values, c(n,i) will be 1 precisely if sc(n,i) assumes the value of the average of the previous episodes, c(n,i) is characteristic of the deviation from the average; thereby, based on the c(n,i) values, entire episodes can also be easily evaluated by comparing them to each other), and M denotes the number of sectors-being in the same episode—that are investigated (this is a fixed value that may be modified in certain cases; in our experience, for example, it is expedient to apply 8 sectors, but it can also be expedient to apply 5-10, particularly 7-9 sectors).

The c(n,i) value, for example, can differ from the sc(n,i) value of the past 8-10 episodes by at most 25%, this is the condition for accepting the corresponding sector. Thereafter, the accepted c(n,i) values are also summed up for C_T. If c(n,i) is considered a binary value, then an acceptance limit—i.e., a limit for regarding an episode as being reliable and acceptable—of for example 75% can be introduced for C_T.

The number of the parts into which an episode is divided is therefore a fixed value, and, accordingly, the width of the sectors will typically vary from episode to episode. The width of individual sectors is thus determined by the requirement that the episode must be divided into equal parts.

These conditions can basically help in detecting uncertain FBM episodes if the measurement in case of strong external effects, and thereby it complements the process described above. The system of the sectors thus provided can be interpreted as some type of "ballast" system. What can be "saved" of an episode, will be saved. This means that in case one of the sectors of an episode is "damaged" (that is, differs significantly from other sectors which more or less exhibit the average values of the episode), it will still be possible to evaluate the episode. In the case of very noisy signals, it is not entirely clear that what is detected is really an FBM. However, applying the above described averaging process based on sectors, the obtained values can be "smoothed", whereby the trends in the signal can be followed.

In line with the above description, a device utilizing the method according to the invention and a system implemented by means of it can be considered smart (intelligent) in the sense that it is capable of acquiring and evaluating data on its own. After installing the phonocardiographic sensor of the system according to the invention, no further expert assistance is needed.

Certain embodiments of the invention are related to a (processing) system adapted for processing a phonocardiographic signal characterising fetal breathing movement (the system can also be considered an arrangement wherein wired or wireless connections are applied). The processing system according to the invention comprises a phonocardiographic sensor 110 (an acoustic sensor adapted for detecting (recording) phonocardiographic signals, i.e., in addition to heart sounds the fetal breathing movement can also be detected) for recording the phonocardiographic signal on an abdominal wall of a mother pregnant with a fetus, and, being in interconnection (i.e., wired or wireless connection) therewith (with the phonocardiographic sensor)

- an initial start point determination module comprising
  - a filter device for generating respective second bandpass-filtered signals corresponding to frequency subbands having respective subband bandwidths by means of a second bandpass filter from a first bandpass-filtered signal obtained by filtering the phonocardiographic signal to a main investigation frequency band by means of a first bandpass filter, and
  - a start point search module for determining a first identified start point corresponding to a fetal breathing movement episode in a frequency subband corresponding to the first identified start point, the start point search module being adapted for searching, investigating presumed fetal breathing movement episodes in the second bandpass-filtered signals for each frequency subband, a start point of a fetal breathing movement episode by comparing an acceptance sum obtained by weighting utilizing measured movement features obtained for the presumed fetal breathing movement episodes with respective acceptance threshold values corresponding to each of the frequency subbands, and
- an episode discover module for searching, by means of the start point search module, a further start point in an episode search time period starting from the first identified start point, and the episode discover module
  - if finds a start point in a frequency subband other than the subband corresponding to the first identified start point at a smaller distance from the first identified start point than a clustering threshold value, then merges it with the first identified start point,
  - if finds a start point in any frequency subband at a larger distance from the identified start point than the clustering threshold value, or in the frequency subband corresponding to the first identified start point at a smaller distance from the first identified start point than the clustering threshold value, then identifies such a start point being closest to the first identified start point as a second identified start point, and episode validity determination module is applied for the first identified start point and the second identified start point, and after that the episode discover module is applied from the second identified start point in case processing of the phonocardiographic signal is continued,
  - if does not find a start point within the episode search time period, then the start point search module is applied for determining another first identified start point in case processing of the phonocardiographic signal is continued.

The modules are typically implemented by means of a computer, i.e., they are essentially devices implemented by a computer; they can also be termed units.

Further features of the invention are described in the following points that define further embodiments. Paragraph 1 below is to be taken to include other features of the invention that are not explicitly mentioned therein, while certain features given in Paragraph 1 can be made to correspond to certain features of the invention. Further subpoints add other optional features to the embodiments according to the references.

1. A method for determining the fetal breathing movement by means of a special acoustic sensor placed on the maternal abdominal wall, wherein time intervals (hereinafter: movement features) with a given signal level and a given signal shape are identified in the sampled and digitized signal for distinguishing the different movement components, furthermore said identification operation is performed by decomposing a preselected frequency band (hereinafter: baseband) into a large number of subbands representing very narrow frequency bands.

2. The method according to paragraph 1, wherein, in course of distinguishing the respective movement components, a prediction method utilizing the known duration of the movement components is applied for searching for the movement features, furthermore a respective confidence value is assigned to each prediction step, and said confidence values are taken into consideration for evaluating the application of the further predictions.

3. The method according to paragraph 1, wherein the search for movement features is basically constituted by discovering hidden periods of the baseband signal that are related to the movement being stopped or slowed down and exhibit minimal signal levels (hereinafter: minimum zones) and by determining the signal levels therein, furthermore this search operation is performed utilizing multiple subbands (except, for example, the subbands excluded due to overdrive) or even all the available subbands, until the number of the discovered possible but not yet sufficiently proven minimum zones reaches a sufficient level, which thus enables the generation of the complete series (hereinafter: epoch) consisting of movement elements.

4. The method according to any of paragraphs 1-3, wherein the discovered minimum zones are validated by determining further movement features, measuring the steepness of the rise period directly succeeding the minimum zone, furthermore the intensity value of the entire length of the movement component estimated by prediction and the phase angle change of the signal that can be measured over the length of the minimum zone in question, wherein the minimum zone is declared an actual minimum zone and thus becomes the start point of the movement component in question if all three movement features exceed a given level.

5. The method according to any of paragraphs 1-4, wherein further minimum zones discovered near the minimum zones designated by prediction, even further minimum zones discovered by means of further subbands are taken into account applying clustering, where the finalized start point of the movement component is determined by also including the minimum zone that had been discovered and validated first.

6. The method according to any of paragraphs 1-5, wherein compiling the epochs is established according to sections, based on definitively validated movement component start points, where, in all cases, the endpoint of an interval has the greatest value in all four movement features mentioned above, and thereby constitutes, with highest confidence, the endpoint of the interval of the epoch in question, furthermore the length of the intervals utilized therein cannot be longer than five movement components.

7. The method according to any of paragraphs 1-6, wherein those epochs (series) that are shorter than 20 minimum zones and contain more than one unverified minimum zones are declared invalid for determining the biophysical profile.

8. The method according to any of paragraphs 1-7, wherein in case the conditions specified above are not fulfilled, the search process switches to investigate, according to conditions completely different from the above specified ones, acoustic signals related to hiccups, in course of which primarily the intensity of the measured sounds, its recurrence time, and the dominant frequency of the signal are determined, furthermore, if these conditions are not fulfilled, the fetus has performed an unidentified movement.

9. The method according to any of paragraphs 1-7, wherein assessment levels applied in course of searching for minimum zones start from an initial (default) value that is updated after each verified movement component, i.e., although only to a small extent, it is adapted to the characteristics of the current epoch.

10. The method according to any of paragraphs 1-7, wherein the episodes are put in order (i.e., a series of them is found) utilizing the recurrence period of 0.8-1.2 s thereof, by changing the start point of the epoch, by filling up the missing minimum zones with phantoms, and by discarding the erroneous minimum zones.

11. The method according to any of paragraphs 1-7, wherein utilizing a time band of the recurrence time, the episodes are put in order by Guided Monte Carlo method, such that, in course of the random selection process each randomly chosen minimum zone gets a probability value providing an advantage in the next random selection, until there remain as few empty spaces as possible for the inclusion of phantoms in the randomly selected number series.

12. The method according to any of paragraphs 1-11, wherein the fetal movements are expediently measured applying the conventional phonocardiographic measurement device disposed on the maternal abdominal wall, but if no fetal movements can be detected in course of the preliminary evaluation of the measured signal, then the method automatically switches to investigate fetal heart activity, and, setting the measurement signal level corresponding thereto, automatically measures the fetal heart rate and the various indices characteristic of the changes thereof.

13. The method according to any of paragraphs 1-11, wherein the protocol established on the basis of measured data comprise the number of epochs found during the measurement period, separately the number of episodes and the number of non-identified (phantom) episodes, the average and standard deviation values of the duration, shape, and intensity of the appropriately identified episodes, and the characteristic temporal change thereof, the number and duration of longer pauses of the breathing movement, and any and all quantities which become important in some aspect if the method in question is widely applied.

14. The method according to any of paragraphs 1-9, wherein the investigation system (investigation apparatus) is adapted to continuously measure, during the pauses between the fetal breathing movement events, the heart murmurs resulting from a potential congenital heart disease of the fetus, and also the so-called "split" also related to a disease that manifests itself in an increased temporal difference between the left- and right-side ventricular valves, furthermore a completely passive, irradiation-free, time limit-free home monitoring of the fetus is thus realized, which according to the present research may provide a chance for a timely detection of intrauterine growth restriction, and, also according to certain scientific opinions, for detecting the predisposition for sudden infant death syndrome early in gestational age.

15. The method according to any of paragraphs 1-9, wherein the investigation system records all the data, and wherein maternal intervention is required (for adjusting the measuring head) only if it is explicitly asked for by the device.

In an embodiment, in course of the method according to the invention (that is preferably adapted for evaluating a phonocardiographic signal characterising fetal breathing movement): providing a digital signal by digitizing an acoustic signal, performing an identification step, wherein higher-frequency sounds generated by movements are identified in the digital signal, in predetermined frequency bands (frequency subbands), the excited sounds are considered, by discovering the minimum zones thereof, as the presumed start points of movement components constituting the movements, the determination thereof being carried out by expediently scanning the frequency bands, accepting the discovered minimum zones as presumed start points, a respective acceptance value is assigned to each minimum zone, and the temporally corresponding values thereby obtained are subjected to clustering, utilizing the temporal distance of these minimum zones from the average value, and constructing, of the movement component start points thereby determined, so-called triplets (said triplets having three elements and being bracketed by four minimum zones), with the complete fetal breathing movement being constructed applying an overlap of one movement component, with the help of which a single respective missing minimum zone of each triplet can be compensated by a phantom minimum zone.

The invention is, of course, not limited to the preferred embodiments described in detail above, but further variants, modifications and developments are possible within the scope of protection determined by the claims.

LEGENDS 110 phonocardiographic sensor
120 bluetooth connection
130 laptop
140 ultrasonic monitor
150 video recorder
S100 initial start point determination
S110 frequency filtering
S120 start point search
S130 episode discovering
S140 episode validity determination
S210 decomposing the measured sample into frequency bands S220 searching for minimum zones in each frequency band
S230 merging the minimum zones by clustering
S240 establishing of the segments
S250 constructing the complete movement process (epoch)
$J_1$ (first) measured movement feature
$J_2$ (second) measured movement feature
$J_3$ (third) measured movement feature
$J_4$ (fourth) measured movement feature

The invention claimed is:

1. A method for processing a phonocardiographic signal characterising fetal breathing movement, in course of which:
   in course of an initial start point determination step
      in a frequency filtering step, generating, by a computer, respective second bandpass-filtered signals corresponding to frequency subbands having respective subband bandwidths by means of a second bandpass filter from a first bandpass-filtered signal obtained by filtering the phonocardiographic signal to a main investigation frequency band by means of a first bandpass filter, and
      determining, by the computer, a first identified start point corresponding to a fetal breathing movement episode in a frequency subband corresponding to the first identified start point in a start point search step, in course of which, investigating presumed fetal breathing movement episodes in the second bandpass-filtered signals for each frequency subband, searching a start point of a fetal breathing movement episode by comparing an acceptance sum obtained by weighting measured movement features obtained for the presumed fetal breathing movement episodes with respective acceptance threshold values corresponding to each of the frequency subbands, and
   in an episode discovering step, searching, by the computer, a further start point applying the start point search step in an episode search time period starting from the first identified start point, and
      if a start point is found in a frequency subband other than the subband corresponding to the first identified start point at a smaller distance from the first identified start point than a clustering threshold value, then it is merged with the first identified start point,
      if a start point is found in any frequency subband at a larger distance from the identified start point than the clustering threshold value, or in the frequency subband corresponding to the first identified start point at a smaller distance from the first identified start point than the clustering threshold value, then such a start point being closest to the first identified start point is identified as a second identified start point, and an episode validity determination step is performed for the first identified start point and the second identified start point, and after that continuing the method with the episode discovering step from the second identified start point in case processing of the phonocardiographic signal is continued,
      if a start point is not found within the episode search time period, then continuing the method with a step adapted for determining another first identified start point in case processing of the phonocardiographic signal is continued.

2. The method according to claim 1, characterised in that a lower time period limit and an upper time period limit of a time period of the fetal breathing movement episode are determined, and the episode search time period is twice as the upper time period limit, and
   if a start point distance between the first identified start point and the second identified start point is between the lower time period limit and the upper time period limit, then the first identified start point is a valid start point,
   if the start point distance between the first identified start point and the second identified start point is between the upper time period limit and the episode search time period, then the first identified start point is a valid start point, and at least one conditional start point dividing the distance between the first and second start point to equal distances is identified between the first identified start point and the second identified start point in such a number, with which the equal distances are nearest to a start point distance average parameter,
   if the start point distance between the first identified start point and the second identified start point is smaller than the lower time period limit, then the investigated start point is an invalid start point.

3. The method according to claim 2, characterised in that the lower time period limit is between 0.6 second and 1 second.

4. The method according to claim 2, characterised in that the lower time period limit is larger than the half of the upper time period limit.

5. The method according to claim 2, characterised in that the lower time period limit is larger than two-thirds of the upper time period limit.

6. The method according to claim 2, characterised in that the upper time period limit is between 1 second and 1.4 seconds.

7. The method according to claim 2, characterised in that in the episode validity determination step
   an actual episode group formed from the second identified start point towards the first identified start point, comprising episodes in a number of an episode number, and a previous episode group formed from a first start point situated towards the first identified start point from the second identified start point and comprises as many episodes as an episode number are applied, in case the start points are available, the second identified start point and further start points bracketing the episodes of the actual episode group corresponding to the episodes of the actual episode group, and the first start point situated towards the first identified start point from the second identified start point and further start points bracketing the episodes of the previous episode group corresponding to the episodes of the previous episode group,
   if there are valid start points and a single conditional start point among the start points corresponding to the actual episode group, and there are valid start points and a single conditional start point among the start points corresponding to the previous episode group, then the conditional start point corresponding to the actual episode group is changed into a valid start point, and
   the valid episodes of the phonocardiographic signal of the fetal breathing movement are given by the episodes starting at a valid start point.

8. The method according to claim 7, characterised in that the episode group is an episode triplet comprising three episodes.

9. The method according to claim 1, characterised by applying, in a step adapted for generating a frequency-dependent start point list, the following measured movement features:
- a first measured movement feature ($J_1$) specifying an intensity of a residual signal in a first interval around a start point,
- a second measured movement feature ($J_2$) specifying an intensity of a rise in a second interval following the first interval,
- a third measured movement feature ($J_3$) specifying the cumulated intensity of the episode in a third interval encompassing the second interval and has a length corresponding to a start point distance average, and
- a fourth measured movement feature ($J_4$) derived on the basis of the frequency subband deviation from a cumulated phase shift of the episode in the first interval.

10. The method according to claim 9, characterised in that the acceptance sum is a weighted sum of the reciprocal of the first measured movement feature ($J_1$), the second measured movement feature ($J_2$), the third measured movement feature ($J_3$), and the fourth measured movement feature ($J_4$).

11. The method according to claim 1, characterised in that the subband bandwidth is in the range of 1-6 Hz.

12. The method according to claim 1, characterised in that the main investigation frequency band is 19-31 Hz.

13. The method according to claim 1, characterised by determining from the phonocardiographic signal
- fetal heart rate, and/or
- fetal hiccups, and/or
- fetal heart murmur, and/or
- maternal effects on the fetal breathing movement are filtered out in course of processing the phonocardiographic signal.

14. A system for processing a phonocardiographic signal characterising fetal breathing movement, comprising a phonocardiographic sensor for recording the phonocardiographic signal on an abdominal wall of a mother pregnant with a fetus, and, being in interconnection therewith, a computer that comprises:
- an initial start point determination module comprising
  - a filter device for generating respective second band-pass-filtered signals corresponding to frequency subbands having respective subband bandwidths by means of a second bandpass filter from a first band-pass-filtered signal obtained by filtering the phonocardiographic signal to a main investigation frequency band by means of a first bandpass filter, and
  - a start point search module for determining a first identified start point corresponding to a fetal breathing movement episode in a frequency subband corresponding to the first identified start point, the start point search module being adapted for searching, investigating presumed fetal breathing movement episodes in the second bandpass-filtered signals for each frequency subband, a start point of a fetal breathing movement episode by comparing an acceptance sum obtained by weighting measured movement features obtained for the presumed fetal breathing movement episodes with respective acceptance threshold values corresponding to each of the frequency subbands, and
- an episode discover module for searching, by means of the start point search module, a further start point in an episode search time period starting from the first identified start point, and the episode discover module if finds a start point in a frequency subband other than the subband corresponding to the first identified start point at a smaller distance from the first identified start point than a clustering threshold value, then merges it with the first identified start point,
  - if finds a start point in any frequency subband at a larger distance from the identified start point than the clustering threshold value, or in the frequency subband corresponding to the first identified start point at a smaller distance from the first identified start point than the clustering threshold value, then identifies such a start point being closest to the first identified start point as a second identified start point, and episode validity determination module is applied for the first identified start point and the second identified start point, and after that the episode discover module is applied from the second identified start point in case processing of the phonocardiographic signal is continued,
  - if does not find a start point within the episode search time period, then the start point search module is applied for determining another first identified start point in case processing of the phonocardiographic signal is continued.

15. A method for processing a phonocardiographic signal characterising fetal breathing movement, comprising:
- receiving, by a computer, the phonocardiographic signal from an acoustic sensor;
- applying, by the computer, a first bandpass filter to the phonocardiographic signal to generate a first set of band-pass filtered signals of a main investigation frequency band;
- applying, by the computer, a second bandpass filter to the first set of band-pass filtered signals to divide the main investigation frequency band into a second set of band-pass filtered signals corresponding to multiple frequency subbands;
- analyzing, by the computer and for each frequency subband, the second set of band-pass filtered signals to identify a first start point of a fetal breathing episode, wherein identifying the first start point includes:
  - calculating measured movement features for the fetal breathing episode,
  - computing an acceptance sum by applying weights to the movement features,
  - comparing the acceptance with acceptance threshold values corresponding to the frequency subbands, and
  - accepting or rejecting the first start point based on said comparing; and
- further analyzing, by the computer and for each subband, a time window beginning after the first start point to identify a further start point of a new fetal breathing episode, wherein identifying the further start point includes:
  - calculating measured movement features for the new fetal breathing episode,
  - computing another acceptance sum by applying the weights to the measured movement features for the new fetal breathing episode,
  - comparing the other acceptance sum with the acceptance threshold values corresponding to the frequency subbands, and
  - in response to the further start point being found in a particular subband that is different from a subband corresponding to the first start point at a smaller distance from the first start point than a clustering threshold value, merge the further start point with the first start point, in response to the further start point being found in any frequency subband at a larger distance from the start point than the clustering value threshold, or in the frequency subband corresponding to the first start point at a smaller distance from the first start point than the clustering threshold value, then such a start point being closest to the first start point is identified as a second start point, or in response to the further start point not being found within the time window beginning after the first start point, identifying yet another start point of a yet another fetal breathing episode.

* * * * *